United States Patent
Heon et al.

(10) Patent No.: US 12,377,694 B2
(45) Date of Patent: Aug. 5, 2025

(54) FRONT SUSPENSION ASSEMBLY FOR AN OFF-ROAD VEHICLE

(71) Applicant: BOMBARDIER RECREATIONAL PRODUCTS INC., Valcourt (CA)

(72) Inventors: Martin Heon, Sherbrooke (CA); Daniel Leclerc, St-Denis-de-Brompton (CA); Philippe Roy Richard, Montreal (CA); Bruno Girouard, Shefford (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 0 days.

(21) Appl. No.: 18/029,486

(22) PCT Filed: Sep. 30, 2021

(86) PCT No.: PCT/IB2021/059019
§ 371 (c)(1),
(2) Date: Mar. 30, 2023

(87) PCT Pub. No.: WO2022/070143
PCT Pub. Date: Apr. 7, 2022

(65) Prior Publication Data
US 2023/0347701 A1    Nov. 2, 2023

Related U.S. Application Data

(60) Provisional application No. 63/085,538, filed on Sep. 30, 2020.

(51) Int. Cl.
*B60G 3/26*     (2006.01)
*B60G 7/00*    (2006.01)
(Continued)

(52) U.S. Cl.
CPC ............ *B60G 3/265* (2013.01); *B60G 7/001* (2013.01); *B60G 7/005* (2013.01); *B60G 7/02* (2013.01);
(Continued)

(58) Field of Classification Search
CPC .. B62K 2005/001; B62K 5/027; B60G 3/265; B60G 2204/1484; B60G 2204/4304;
(Continued)

(56) References Cited

U.S. PATENT DOCUMENTS 3,193,304 A * 7/1965 Behlke ................ B60G 17/021
267/222
3,630,303 A * 12/1971 Froumajou .......... B60G 15/062
280/124.136
(Continued)

FOREIGN PATENT DOCUMENTS

CN       107571698 A     1/2018
CN       109843612 A     6/2019
(Continued)

OTHER PUBLICATIONS

Vadhe; Design and Optimization of Formula SAE Suspension system; International Journal of Current Engineering and Technology; available online May 23, 2018; vol. 8; No. 3 (May/Jun. 2018); pp. 609-635.
(Continued)

*Primary Examiner* — Timothy Wilhelm
(74) *Attorney, Agent, or Firm* — BCF LLP

(57) ABSTRACT

A vehicle including a frame; a front left suspension assembly with a front left wheel; a front right suspension assembly with a front right wheel; a front gear train; a motor; shafts connected between the front wheels and the front gear train. Each front suspension assembly including a knuckle including: a first portion connected to a wheel hub and including
(Continued)

a first ball joint, and a second portion extending upward from the first portion and including a second ball joint; a lower A-arm connected to the first ball joint; an upper A-arm connected to the second ball joint; the second ball joint being distanced from the wheel axis by a distance greater than the inner rim radius; and a shock assembly connected to the lower A-arm and the frame, the shafts passing below the ball joint of the shock absorber assembly which is vertically higher than the shaft.

18 Claims, 17 Drawing Sheets

(51) Int. Cl.
  *B60G 7/02* (2006.01)
  *B60G 21/055* (2006.01)
  *B62D 7/18* (2006.01)

(52) U.S. Cl.
  CPC ............ *B60G 21/0551* (2013.01); *B62D 7/18* (2013.01); *B60G 2200/144* (2013.01); *B60G 2200/422* (2013.01); *B60G 2200/44* (2013.01); *B60G 2204/1244* (2013.01); *B60G 2204/14* (2013.01); *B60G 2204/4302* (2013.01); *B60G 2206/124* (2013.01)

(58) Field of Classification Search
  CPC ............ B60G 2200/17; B60G 2300/07; B60G 2204/129; B60G 2200/422; B60G 2202/312; B60G 2204/14; B60G 2204/416; B60G 2206/50; B60G 15/065; B60G 3/20; B60G 7/001; B60G 7/005; B60G 21/0551; B60G 2200/144; B60G 2200/44; B60G 2204/1244; B60G 2204/4302; B60G 2206/124; B60G 7/02; B62D 7/18
  See application file for complete search history.

(56) References Cited

U.S. PATENT DOCUMENTS

| | | | | |
|---|---|---|---|---|
| 4,271,922 A * | 6/1981 | Kishline | ............... | B60G 3/24 180/358 |
| 4,377,298 A * | 3/1983 | Finn | ............... | B60G 15/062 280/124.145 |
| 4,538,831 A * | 9/1985 | Kami | ............... | B60G 3/265 280/124.138 |
| 4,802,688 A * | 2/1989 | Murakami | ............... | B60G 7/008 280/124.138 |
| 4,810,002 A * | 3/1989 | Kakimoto | ............... | B60G 3/265 280/124.138 |
| 4,834,417 A * | 5/1989 | Achleitner | ............... | B60G 15/062 280/124.145 |
| 4,995,633 A * | 2/1991 | Santo | ............... | B60G 15/062 280/124.145 |
| 5,380,035 A * | 1/1995 | Lee | ............... | B60G 3/265 280/124.145 |
| 5,938,219 A * | 8/1999 | Hayami | ............... | B60G 3/20 280/124.135 |
| 6,250,415 B1 * | 6/2001 | Seto | ............... | F16H 3/089 180/371 |
| 6,695,329 B2 * | 2/2004 | Handa | ............... | B60G 3/18 280/124.152 |
| 6,883,630 B2 * | 4/2005 | Morin | ............... | B60T 1/065 180/370 |
| 7,234,712 B2 * | 6/2007 | Yamazaki | ............... | B62D 7/18 280/93.51 |
| 7,398,982 B2 * | 7/2008 | Hozumi | ............... | B60G 3/20 280/124.135 |
| 7,490,840 B2 * | 2/2009 | Luttinen | ............... | B60G 3/06 280/124.126 |
| 7,614,476 B2 * | 11/2009 | Seki | ............... | F16D 3/224 180/383 |
| 7,661,687 B2 * | 2/2010 | Seki | ............... | B60G 21/0551 280/124.135 |
| 7,802,800 B2 * | 9/2010 | Melcher | ............... | B62K 5/10 180/41 |
| 7,828,108 B2 * | 11/2010 | Schlangen | ............... | B62K 5/01 180/384 |
| 7,931,286 B2 * | 4/2011 | Melcher | ............... | B60G 17/0162 280/5.521 |
| 8,061,726 B2 * | 11/2011 | Kunert | ............... | B60G 3/20 280/124.144 |
| 8,205,900 B1 * | 6/2012 | Moravy | ............... | B60G 3/20 280/124.138 |
| 8,430,413 B2 * | 4/2013 | Kuwabara | ............... | B62K 5/01 280/124.155 |
| 8,517,135 B2 | 8/2013 | Schapf et al. | | |
| 8,573,615 B2 * | 11/2013 | Kuwabara | ............... | B60G 3/06 280/124.145 |
| 8,875,830 B2 | 11/2014 | Massicotte et al. | | |
| 8,919,794 B2 * | 12/2014 | Kunert | ............... | B60G 21/0551 280/124.152 |
| 9,663,145 B2 * | 5/2017 | Schroeder | ............... | B60G 3/20 |
| 9,694,872 B2 * | 7/2017 | Laroche | ............... | B62K 5/05 |
| 9,815,346 B2 * | 11/2017 | Suzuki | ............... | B60K 5/00 |
| 9,981,519 B2 * | 5/2018 | Despres-Nadeau | ...... | B60N 2/38 |
| 9,988,083 B1 | 6/2018 | Smith | | |
| 10,052,928 B2 * | 8/2018 | Christoff | ............... | B60G 15/10 |
| 10,442,458 B2 * | 10/2019 | Heon | ............... | B62D 3/12 |
| 10,556,474 B2 * | 2/2020 | Andou | ............... | B60G 7/001 |
| 10,967,694 B2 * | 4/2021 | Brady | ............... | B60G 21/055 |
| 11,192,414 B1 * | 12/2021 | Berardi | ............... | B60G 7/003 |
| 11,358,634 B2 * | 6/2022 | Mainville | ............... | B60G 3/20 |
| 11,628,722 B2 * | 4/2023 | Rasa | ............... | B60K 17/043 180/356 |
| 11,738,417 B2 * | 8/2023 | Paulsen | ............... | B60G 13/005 29/897.2 |
| 11,772,442 B2 * | 10/2023 | Verbridge | ............... | B62D 7/18 280/93.512 |
| 11,807,059 B1 * | 11/2023 | Smith | ............... | B60G 13/005 |
| 2001/0028156 A1 | 10/2001 | Handa | | |
| 2002/0017750 A1 * | 2/2002 | Miyamoto | ............... | B60G 3/18 267/293 |
| 2005/0146111 A1 * | 7/2005 | Yamazaki | ............... | B62D 7/18 280/124.135 |
| 2006/0290088 A1 * | 12/2006 | Luttinen | ............... | B60G 3/265 280/124.145 |
| 2007/0045015 A1 * | 3/2007 | Yamamoto | ............... | B60R 16/04 180/68.5 |
| 2007/0066429 A1 * | 3/2007 | Seki | ............... | B62K 5/027 474/112 |
| 2007/0090621 A1 * | 4/2007 | Vigen | ............... | B60G 7/02 280/124.113 |
| 2007/0193815 A1 * | 8/2007 | Hobbs | ............... | B60G 21/05 280/124.156 |
| 2008/0012262 A1 * | 1/2008 | Carabelli | ............... | B60G 21/073 280/124.106 |
| 2010/0117318 A1 * | 5/2010 | Grozev | ............... | B60G 17/0523 280/124.16 |
| 2010/0117320 A1 * | 5/2010 | Grozev | ............... | B60G 11/58 280/124.16 |
| 2011/0048833 A1 | 3/2011 | Schapf et al. | | |
| 2015/0151597 A1 * | 6/2015 | Zuge | ............... | B60G 3/14 280/124.135 |
| 2016/0347137 A1 * | 12/2016 | Despres-Nadeau | .... | B60G 3/202 |
| 2016/0347350 A1 * | 12/2016 | Heon | ............... | B60G 13/001 |
| 2018/0001723 A1 | 1/2018 | Andou et al. | | |
| 2018/0215220 A1 * | 8/2018 | Mailhot | ............... | B62D 7/18 |
| 2019/0135340 A1 * | 5/2019 | Mainville | ............... | B60G 3/20 |
| 2020/0130450 A1 * | 4/2020 | Nakashima | ............... | B60G 3/20 |
| 2020/0231250 A1 * | 7/2020 | Vigen | ............... | B62M 27/02 |
| 2022/0055434 A1 * | 2/2022 | Hansen | ............... | B60G 7/001 |
| 2022/0250430 A1 * | 8/2022 | Kolp | ............... | B60G 7/02 |
| 2022/0281278 A1 * | 9/2022 | Boulay | ............... | F16F 9/3235 |
| 2023/0347701 A1 * | 11/2023 | Heon | ............... | B60G 7/001 |

(56) References Cited

U.S. PATENT DOCUMENTS

FOREIGN PATENT DOCUMENTS

| CN | 110605944 A | 12/2019 |
| WO | 2018033768 A1 | 2/2018 |
| WO | 2020187885 A1 | 9/2020 |

OTHER PUBLICATIONS

International Search Report of PCT/IB2021/059019; Harry Kim; Dec. 20, 2021.
Office Action issued from the Chinese Patent Office in connection with the corresponding application No. 202180066561.X on Oct. 25, 2023 and including Search Report.

\* cited by examiner

FRONT SUSPENSION ASSEMBLY FOR AN OFF-ROAD VEHICLE

CROSS-REFERENCE

The present application claims priority to U.S. Provisional Patent Application No. 63/085,538, entitled "Front Suspension Assembly for an Off-Road Vehicle," filed on Sep. 30, 2020, the entirety of which is incorporated herein by reference.

FIELD OF TECHNOLOGY

The present technology relates to front suspension assemblies for off-road vehicles.

BACKGROUND

There exist various types of vehicles used mainly in off-road conditions. One such type is the side-by-side off-road vehicle. The name "side-by-side" refers to the seating arrangement of the vehicle in which the driver and a passenger are seated side-by-side. Some side-by-side off-road vehicles also have a second row of seats to accommodate one or more additional passengers. These vehicles typically have an open cockpit, a roll cage and a steering wheel.

To be able to operate in off-road conditions, a side-by-side off-road vehicle needs to be able to handle bumpy terrain to operate on various surfaces including, but not limited to, sand, dirt and mud. These conditions represent unique challenges not typically encountered when designing on-road vehicles such as a car.

One such challenge is that the suspension assemblies need to have a large amount of travel to handle the bumpy terrain. However, as the wheels move up and down with the suspension assemblies, strain can be induced on the frame at points where the suspension assemblies connect. If the stress is substantial and concentrated over a small portion of the frame, the frame could be negatively affected. The total amount of travel available in front suspension assemblies can further be limited by the arrangement of drive shafts, shock absorbers and/or steering assemblies.

Thus there is a desire for a suspension assembly suitable for the operating conditions of side-by-side off-road vehicles.

SUMMARY

It is an object of the present technology to ameliorate at least some of the inconveniences present in the prior art.

According to an aspect of the present technology, there is provided a vehicle with front suspension assemblies having knuckles that extend out of the center region of the wheel, such that an upper A-arm connects to the knuckle further from the wheel center than the radius of the wheel rim. As such, the upper A-arm connection to a frame of the vehicle and a lower A-arm connection to the frame are spaced, and stress induced by those connections are spread over a larger area compared to arrangements with both upper and lower A-arms connecting to the wheel near the wheel hub (for example). By extending a top end of the knuckle (where the upper A-arm is connected) generally above the wheel, the kingpin length is increased and the spindle length is similarly comparatively reduced. In order to allow greater up and down movement of the wheels relative to the frame, the lower A-arm also includes a bracket extending upward from a top surface thereof, to which the shock absorber assembly is connected. A shaft operatively connected to the front gear train, for driving the front wheel, extends under the bracket and above a bottom of the lower A-arm, such that the shaft is at least partially shielded from debris from the road.

According to one aspect of the present technology, there is provided a vehicle including a frame; a driver seat connected to the frame; a front left suspension assembly connected to the frame; a front left wheel operatively connected to the front left suspension assembly, the front left wheel having a left wheel axis, the front left wheel including: a front left rim having an inner rim radius, and a front left tire mounted to the front left rim; a front right suspension assembly connected to the frame; a front right wheel operatively connected to the front right suspension assembly, the front right wheel having a right wheel axis, the front right wheel including: a front right rim having the inner rim radius, and a front right tire mounted to the front right rim; a rear left suspension assembly connected to the frame; a rear left wheel operatively connected to the rear left suspension assembly; a rear right suspension assembly connected to the frame; a rear right wheel operatively connected to the rear right suspension assembly; a front gear train operatively connected to the front left wheel and the front right wheel; a motor operatively connected to the front gear train, the motor driving the front right wheel and the front left wheel via the front gear train; a right shaft having a laterally outward end connected to the front right wheel and a laterally inward end connected to the front gear train; and a left shaft having a laterally outward end connected to the front left wheel and a laterally inward end connected to the front gear train, each of the front left suspension assembly and the front right suspension assembly comprising: a knuckle pivotally connected to a corresponding one of the front right wheel and the front left wheel, the knuckle including: a first portion connected to a wheel hub, the wheel hub being operatively connected to the corresponding one of the front right wheel and the front left wheel, the first portion including a first ball joint, and a second portion connected to and extending generally upward from the first portion, the second portion including a second ball joint disposed at a top portion of the knuckle; a lower A-arm having a laterally outward end pivotally connected to the first ball joint of the knuckle and two laterally inward ends pivotally connected to the frame; an upper A-arm having a laterally outward end pivotally connected to the second ball joint of the knuckle and two laterally inward ends pivotally connected to the frame, the second ball joint being distanced from a corresponding one of the right wheel axis and the left wheel axis by a distance greater than the inner rim radius; and a shock absorber assembly having a lower end pivotally connected to the lower A-arm via a ball joint of the shock absorber assembly and an upper end pivotally connected to the frame, a corresponding one of the left shaft and the right shaft passing below the ball joint of the shock absorber assembly connected to the lower A-arm, the ball joint being disposed vertically higher than the corresponding one of the left shaft and the right shaft along a vertical line transecting the ball joint and the corresponding one of the left shaft and the right shaft.

In some implementations, for each of the front left suspension assembly and the front right suspension assembly, the corresponding one of the left shaft and the right shaft is disposed rearward of a front edge of the lower A-arm and forward of a rear edge of the lower A-arm.

In some implementations, each of the front left suspension assembly and the front right suspension assembly further comprises: a bracket connected to the lower A-arm, the bracket extending upward from a top surface of the lower A-arm, the ball joint being connected to the bracket; and wherein: the lower end of the shock absorber assembly is connected to the bracket, the shock absorber being connected to the lower A-arm via the bracket.

In some implementations, for each of the front left suspension assembly and the front right suspension assembly, the corresponding one of the left shaft and the right shaft passes through a triangular space defined by a cross-sectional plane transecting: the bracket, a front edge of the lower A-arm, and a rear edge of the lower A-arm.

In some implementations, for each of the front left suspension assembly and the front right suspension assembly, the bracket is integrally formed with the lower A-arm.

In some implementations, for the front left suspension assembly, when the vehicle is at rest: the left shaft is disposed above the lower A-arm and under a portion of the bracket; and for the front right suspension assembly, when the vehicle is at rest: the right shaft is disposed above the lower A-arm and under a portion of the bracket.

In some implementations, for the front left suspension assembly, when the vehicle is at rest: the left shaft is disposed above a lower surface of the lower A-arm; and for the front right suspension assembly, when the vehicle is at rest: the right shaft is disposed above a lower surface of the lower A-arm.

In some implementations, for the front left suspension assembly, when the vehicle is at rest: the left shaft is disposed above a top surface of the lower A-arm; and for the front right suspension assembly, when the vehicle is at rest: the right shaft is disposed above a top surface of the lower A-arm.

In some implementations, further including a steering wheel disposed forward of the driver seat; a steering assembly operatively connected to the steering wheel; and wherein each of the front left suspension assembly and the front right suspension assembly further comprises: a third ball joint connected to the knuckle, a steering rod operatively connected to the steering assembly at a lateral inward end, and a lateral outward end of the steering rod being connected to the third ball joint.

In some implementations, for each of the front left suspension assembly and the front right suspension assembly, the steering rod is disposed rearward of the shock absorber assembly.

In some implementations, for each of the front left suspension assembly and the front right suspension assembly, the lower A-arm includes a front arm and a rear arm; and the vehicle further comprises a sway bar assembly including: a sway bar; a left link having a bottom end pivotally connected to the front arm of the lower A-arm of the front left suspension assembly and a top end pivotally connected to a left end of the sway bar; and a right link having a bottom end pivotally connected to the front arm of the lower A-arm of the front right suspension assembly and a top end pivotally connected to a right end of the sway bar.

In some implementations, the sway bar includes: a central portion arranged generally horizontally left to right; a right portion extending generally forward from a right end of the central portion; and a left portion extending generally forward from a left end of the central portion.

In some implementations, the central portion of the sway bar is disposed forward of the shock absorber assembly of the front left suspension assembly and the shock absorber assembly of the front right suspension assembly.

In some implementations, the upper end of the shock absorber assembly of the front right suspension assembly is at a first distance from the upper end of the shock absorber assembly of the front left suspension assembly; the two laterally inward ends of the right upper A-arm are at a second distance from the two laterally inward ends of the left upper A-arm; the two laterally inward ends of the right lower A-arm are at a third distance from the two laterally inward ends of the left lower A-arm; the first distance is less than the second distance; and the first distance is less than the third distance.

In some implementations, for each of the front left suspension assembly and the front right suspension assembly, a kingpin axis is defined by a line extending through the first ball joint and the second ball joint.

In some implementations, for each of the front left suspension assembly and the front right suspension assembly, an upper distance from the wheel axis to the second ball joint is greater than two times a lower distance from the wheel axis to the first ball joint, each of the upper distance and the lower distance being measured along the kingpin axis.

In some implementations, for each of the front left suspension assembly and the front right suspension assembly, the kingpin axis, the second portion of the knuckle, the shock absorber assembly, and a corresponding one of the left shaft and the right shaft extend in a common plane.

In some implementations, for each of the front left suspension assembly and the front right suspension assembly, a ratio of a spindle length to a kingpin length is less than 1:15.

In some implementations, for each of the front left suspension assembly and the front right suspension assembly, a top end of the second portion of the knuckle and the laterally outward end of the upper A-arm are disposed vertically higher than a top surface of a corresponding one of the front right wheel and the front left wheel.

In some implementations, for each of the front left suspension assembly and the front right suspension assembly, the second portion of the knuckle extends vertically along an interior side of a corresponding one of the front right wheel and the front left wheel.

According to another aspect of the present technology, there is provided a vehicle including a frame; a driver seat connected to the frame; a front left suspension assembly connected to the frame; a front left wheel operatively connected to the front left suspension assembly, the front left wheel having a left wheel axis, the front left wheel including: a front left rim having an inner rim radius, and a front left tire mounted to the front left rim; a front right suspension assembly connected to the frame; a front right wheel operatively connected to the front right suspension assembly, the front right wheel having a right wheel axis, the front right wheel including: a front right rim having the inner rim radius, and a front right tire mounted to the front right rim; a rear left suspension assembly connected to the frame; a rear left wheel operatively connected to the rear left suspension assembly; a rear right suspension assembly connected to the frame; a rear right wheel operatively connected to the rear right suspension assembly; a front gear train operatively connected to the front left wheel and the front right wheel; a housing supported by the frame, the front gear train being disposed in the housing, the housing having a width defined by a distance between a right side of the housing and a left side of the housing; a motor operatively connected to the front gear train, the motor driving the front right wheel and the front left wheel via the front gear train; a right shaft having a laterally outward end connected to the front right wheel and a laterally inward end connected to the front gear train within the housing; and a left shaft having a laterally outward end connected to the front left wheel and a laterally inward end connected to the front gear train within the housing, each of the front left suspension assembly and the front right suspension assembly comprising: a knuckle pivotally connected to a corresponding one of the front right wheel and the front left wheel, the knuckle including: a first portion connected to a wheel hub, the wheel hub being operatively connected to the corresponding one of the front right wheel and the front left wheel, the first portion including a first ball joint, and a second portion connected to and extending generally upward from the first portion, the second portion including a second ball joint disposed at a top portion of the knuckle; a lower A-arm having a laterally outward end pivotally connected to the first ball joint of the knuckle and two laterally inward ends pivotally connected to the frame; an upper A-arm having a laterally outward end pivotally connected to the second ball joint of the knuckle and two laterally inward ends pivotally connected to the frame, the second ball joint being distanced from a corresponding one of the right wheel axis and the left wheel axis by a distance greater than the inner rim radius; and a shock absorber assembly having a lower end pivotally connected to the lower A-arm and an upper end pivotally connected to the frame, a distance separating the upper end of the shock absorber of the front left suspension assembly and the upper end of the shock absorber of the front right suspension assembly being smaller than the width of the front gear train.

In some implementations, a distance separating the two laterally inward ends of the lower A-arm of the front left suspension assembly and the two laterally inward ends of the lower A-arm of the front right suspension assembly being smaller than the width of the front gear train.

In some implementations, a distance separating the two laterally inward ends of the upper A-arm of the front left suspension assembly and the two laterally inward ends of the upper A-arm of the front right suspension assembly being smaller than the width of the front gear train.

In some implementations, for each of the front left suspension assembly and the front right suspension assembly, the kingpin axis, the second portion of the knuckle, the shock absorber assembly, and a corresponding one of the left shaft and the right shaft extend in a common plane.

In some implementations, for each of the front left suspension assembly and the front right suspension assembly, a ratio of a spindle length to a kingpin length is less than 1:15.

In some implementations, for each of the front left suspension assembly and the front right suspension assembly, a top end of the second portion of the knuckle and the laterally outward end of the upper A-arm are disposed vertically higher than a top surface of a corresponding one of the front right wheel and the front left wheel.

In some implementations, for each of the front left suspension assembly and the front right suspension assembly, the second portion of the knuckle extends vertically along an interior side of a corresponding one of the front right wheel and the front left wheel.

In some implementations, each of the front left suspension assembly and the front right suspension assembly further comprises: a bracket connected to the lower A-arm, the bracket extending upward from a top surface of the lower A-arm; and wherein: the lower end of the shock absorber assembly is connected to the bracket, the shock absorber being connected to the lower A-arm via the bracket.

In some implementations, for each of the front left suspension assembly and the front right suspension assembly, the bracket is integrally formed with the lower A-arm.

For purposes of this application, terms related to spatial orientation such as forwardly, rearward, upwardly, downwardly, left, and right, are as they would normally be understood by a driver of the vehicle sitting thereon in a normal riding position. Terms related to spatial orientation when describing or referring to components or sub-assemblies of the vehicle, separately from the vehicle should be understood as they would be understood when these components or sub-assemblies are mounted to the vehicle, unless specified otherwise in this application.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

It should be noted that the Figures may not be drawn to scale, unless otherwise indicated.

DETAILED DESCRIPTION

The present technology will be described with respect to a four-wheel off-road vehicle 10 having two side-by-side seats 24, 26 and a steering wheel 28. However, it is contemplated that some aspects of the present technology may apply to other types of vehicles such as, but not limited to, off-road vehicles having a handlebar and a straddle seat (i.e. an all-terrain vehicle (ATV)) and off-road vehicles having more or less than four wheels.

Figure 1:
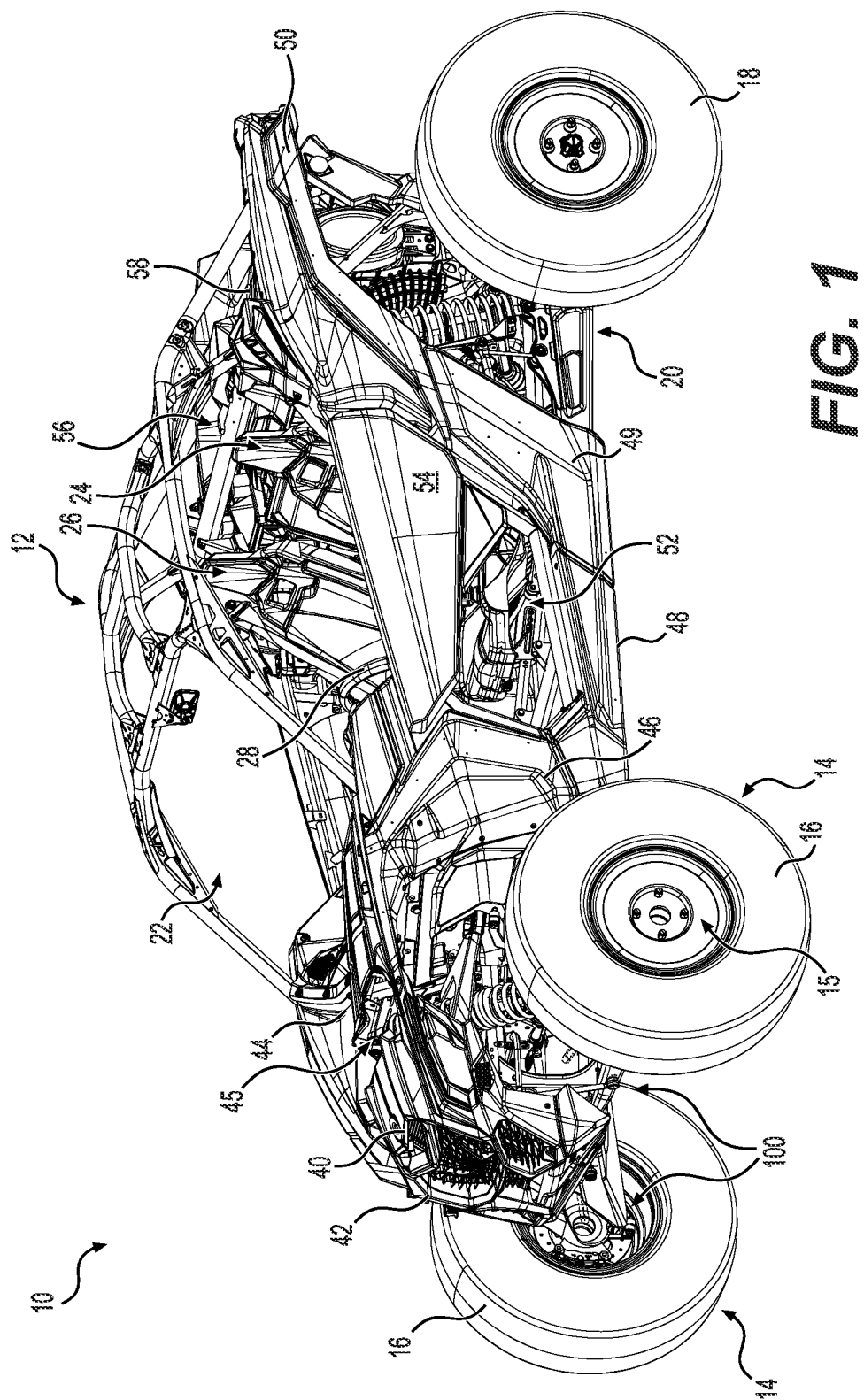
FIG. 1 is a perspective view of an off-road vehicle taken from a front, left side.

The general features of the off-road vehicle 10 will be described with respect to FIGS. 1 to 3. The vehicle 10 has a frame 12 and two front wheels 14 (a front right wheel 14 and a front left wheel 14) connected to a front of the frame 12 by front suspension assemblies 100. The front wheels 14 are laterally separated by a track width 99. In the illustrated embodiment, the track width is approximately 1778 mm to 1956 mm (70 to 78 in) although the width could vary in different embodiments or different models of the vehicle 10.

The front right wheel 14 includes a front right rim 15 having an inner rim radius 17, and a front right tire 16 mounted to the front right rim 15. The front left wheel 14 includes a front left rim 15 having the inner rim radius 17, and a front left tire 16 mounted to the front left rim 15. While the front rims 15 may be formed (for example with a tapered thickness) such that different radii could be defined, the inner rim radius 17 is defined herein as the largest possible radius (from a center point to the farthest edge). Each of the left and right front wheels 14 is connected to a wheel hub 19 (shown in FIG. 10A) that is rotationally connected to a knuckle 150 (described below) such that the wheel 14 can rotate about a corresponding left and right wheel axis 21 (see FIGS. 2 and 8). In the illustrated embodiment, the rims 15 of the front wheels 14 are 16-inch rims 15; the inner rim radius 17 is thus approximately 203.2 mm (8 inch). The tires 16 mounted on the rims 15 in the illustrated embodiment are 34-inch (863.6 mm) diameter tires 16. Depending on the embodiment, rims and tires of different sizes could be used. Operation and control of the front wheels 14 will be described in more detail below. The vehicle 10 also includes two rear wheels 18 connected to the frame 12 by rear suspension assemblies 20.

The frame 12 defines a central cockpit area 22 inside which are disposed a driver seat 24 and a passenger seat 26. In the present implementation, the driver seat 24 is disposed on the left side of the vehicle 10 and the passenger seat 26 is disposed on the right side of the vehicle 10. However, it is contemplated that the driver seat 24 could be disposed on the right side of the vehicle 10 and that the passenger seat 26 could be disposed on the left side of the vehicle 10. The driver seat 24 has a seat index point (SIP) 97, also referred to as an H-point 97, an approximate position of which is illustrated in FIG. 2, as well as FIG. 14. The SIP 97 is determined using a seat index point device, as directed by the Surface Vehicle Standard SAE J1163 MAY2012 (doi.org/10.42715116_3201205), the entirety of which is incorporated herein by reference. In different embodiments, it is contemplated that the exact position of the SIP 97 could vary.

A steering wheel 28 is disposed in front of the driver seat 24. The steering wheel 28 is used to turn the front wheels 14 to steer the vehicle 10 via a steering assembly 23 (shown schematically). Various displays and gauges 29 are disposed above the steering wheel 28 to provide information to the driver regarding the operating conditions of the vehicle 10. Examples of displays and gauges 29 include, but are not limited to, a speedometer, a tachometer, a fuel gauge, a transmission position display, and an oil temperature gauge.

Figure 2:
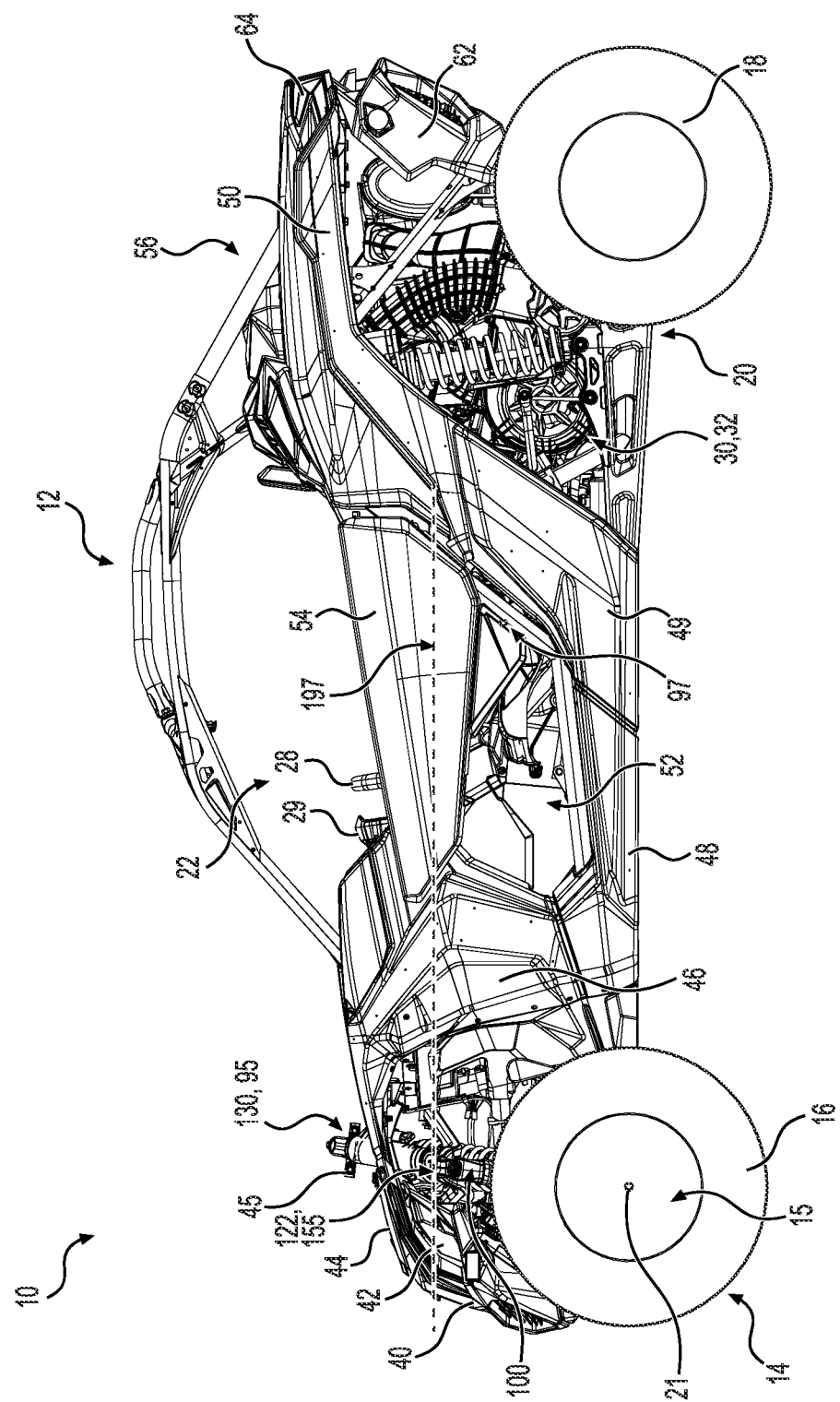
FIG. 2 is a left side elevation view of the vehicle of FIG. 1.
Figure 7:
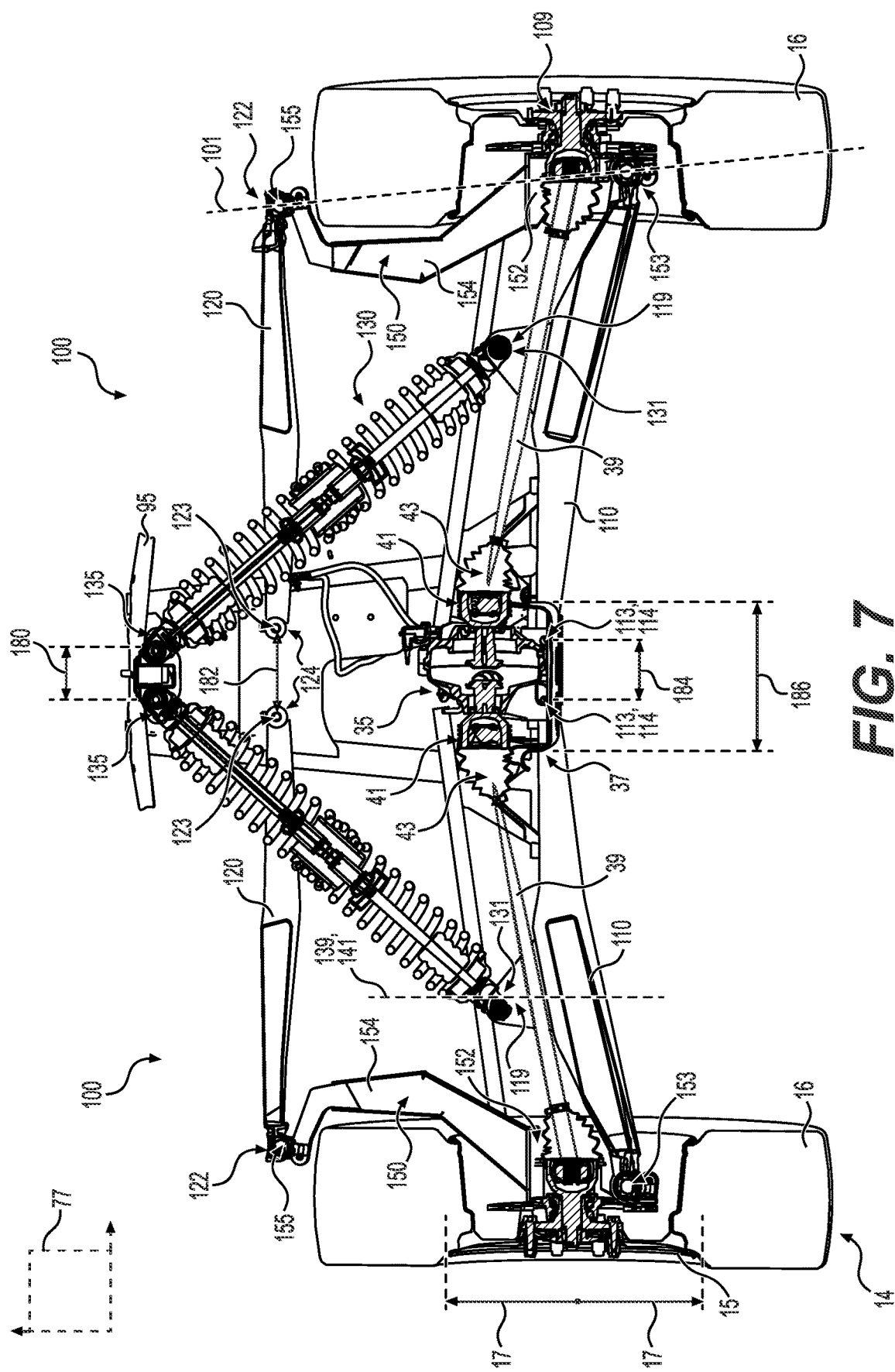
FIG. 7 is a cross-sectional view of the vehicle components of FIG. 4, taken along the line 7-7 of FIG. 6.

As can be seen in FIG. 2, the vehicle 10 includes a motor 30, specifically an internal combustion engine 30, connected to the frame 12 in a rear portion of the vehicle 10. The engine 30 is connected to a continuously variable transmission (CVT) 32 disposed on a left side of the engine 30. The CVT 32 is operatively connected to a transaxle (not shown) to transmit torque from the engine 30 to the transaxle. The transaxle is operatively connected to the front and rear wheels 14, 18 to propel the vehicle 10. For the front wheels 14, the transaxle connects to a front gear train 35 (shown schematically in FIGS. 1 and 3, see also FIG. 7). The front gear train 35 is disposed in a gear train housing 37 (FIG. 7). The vehicle 10 includes two shafts 39, also referred to as half-shafts 39, which connect the front gear train 35 to the front wheels 14. A left shaft 39 has a laterally outward end connected to the front left wheel 14 and a laterally inward end connected to the front gear train 35. A right shaft 39 has a laterally outward end connected to the front right wheel 14 and a laterally inward end connected to the front gear train 35. The driven output gears of the front differential 35 are thus operatively connected to and drive the left and right shafts 39 via constant velocity (CV) joints 41, also known as homokinetic joints, located inside flexible covers 43. Arrangement of the shafts 39 relative to front suspension assemblies 100 will be described in more detail below.

Turning back to FIGS. 1 to 3, body panels of the vehicle 10 will be described. The body panels are connected to the frame 12. The panels help protect the internal components of the vehicle 10 and provide some of the aesthetic features of the vehicle 10. Front panels 40 are connected to a front of the frame 12. The front panels 40 are disposed forward of the front suspension assemblies 100 and laterally between the front wheels 14. The front panels 40 define two apertures inside which the headlights 42 of the vehicle 10 are disposed. A cover 44 extends generally horizontally reward from a top of the front panels 40. The cover 44 defines an aperture 45 through which tops of the front suspension assemblies 16 protrude as will be described in greater detail below. Front fenders 46 are disposed rearward of the front panels 40 on each side of the vehicle 10. Each front fender 46 is disposed in part above and in part behind of its corresponding front wheel 14. Lower panels 48 extend along the bottom of the frame 12 between the front and rear wheels 14, 18. As can be seen in FIG. 2 for the left lower panel 48, each lower panel 48 has a front end disposed under the bottom portion of its corresponding front fender 46 and extends rearward therefrom. A generally L-shaped panel 49 is disposed behind the rear end of each lower panel 48. Generally, L-shaped rear fenders 50 extend upward and then rearward from the rear, upper ends of the L-shaped panels 49. Each rear fender 50 is disposed in part above and in part forward of its corresponding rear wheel 18. The rear fenders 50 define apertures at the rear thereof to receive the brake lights 64 of the vehicle 10. It is contemplated that the brake lights 64 could be replaced with reflectors or that reflectors could be provided in addition to the brake lights 64.

On each side of the vehicle 10, the front fender 46, the lower panel 48, the L-shaped panel 49 and the rear fender 50 define a passage 52 through which a driver (or passenger depending on the side of the vehicle 10) can enter or exit the vehicle 10. Each side of the vehicle 10 is provided with a door 54 that selectively closes an upper portion of the corresponding passage 52. Each door 54 is hinged at a rear thereof to its corresponding rear fender 50 and associated portion of the frame 12 and is selectively connected at a front thereof to its corresponding front fender 46 via a releasable latch (not shown). It is contemplated that each door 54 could be hinged at a front thereof and latched at a rear thereof. As best seen in FIG. 2 for the left side of the vehicle 10, when the doors 52 are closed the lower portions of the passages 52 are still opened. It is contemplated that nets could extend in the lower portions of the passages 52 when the doors 54 are closed or that the doors 54 could be larger so as to close the lower portions of the passages 52.

Figure 3:
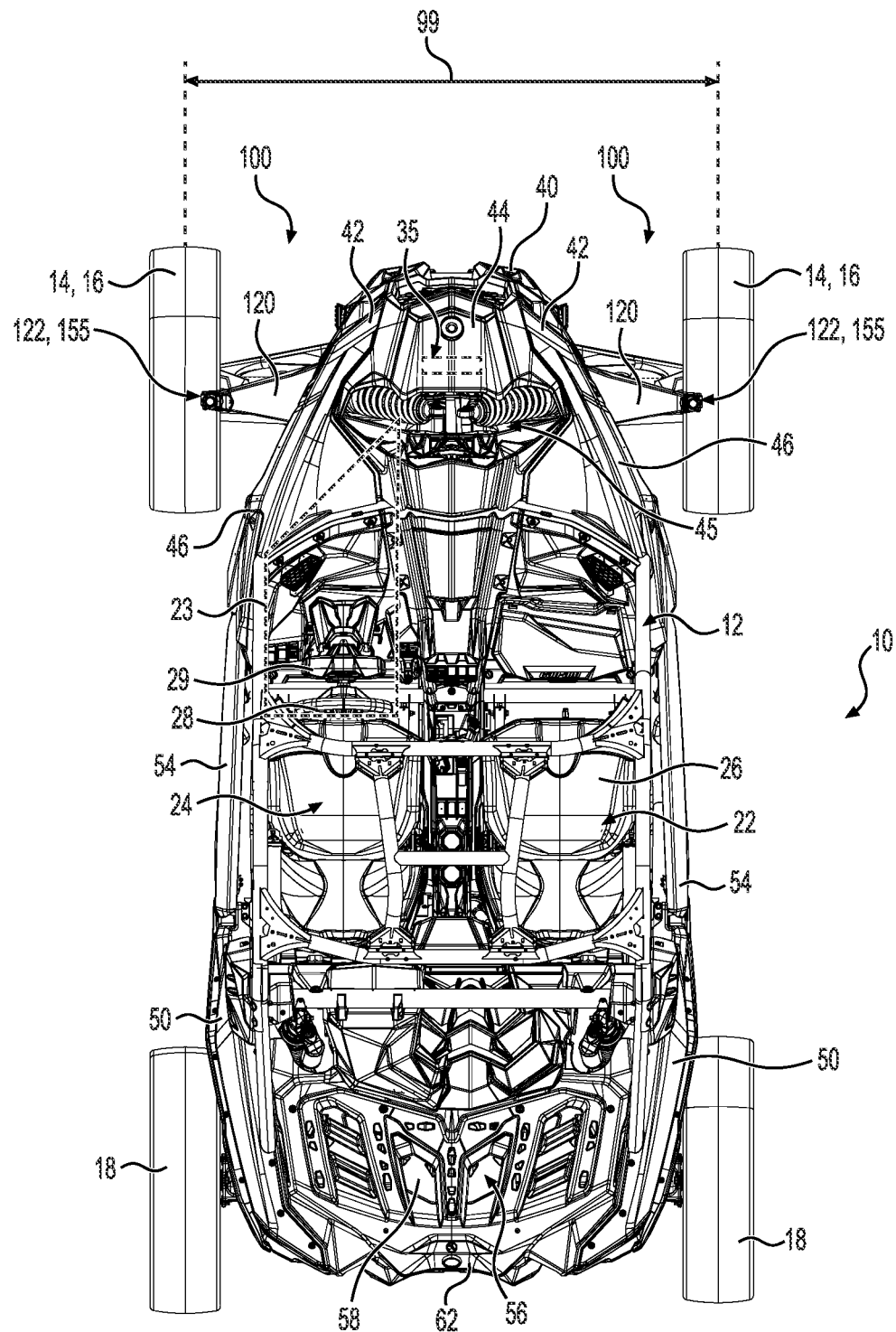
FIG. 3 is a top plan view of the vehicle of FIG. 1.
Figure 4:
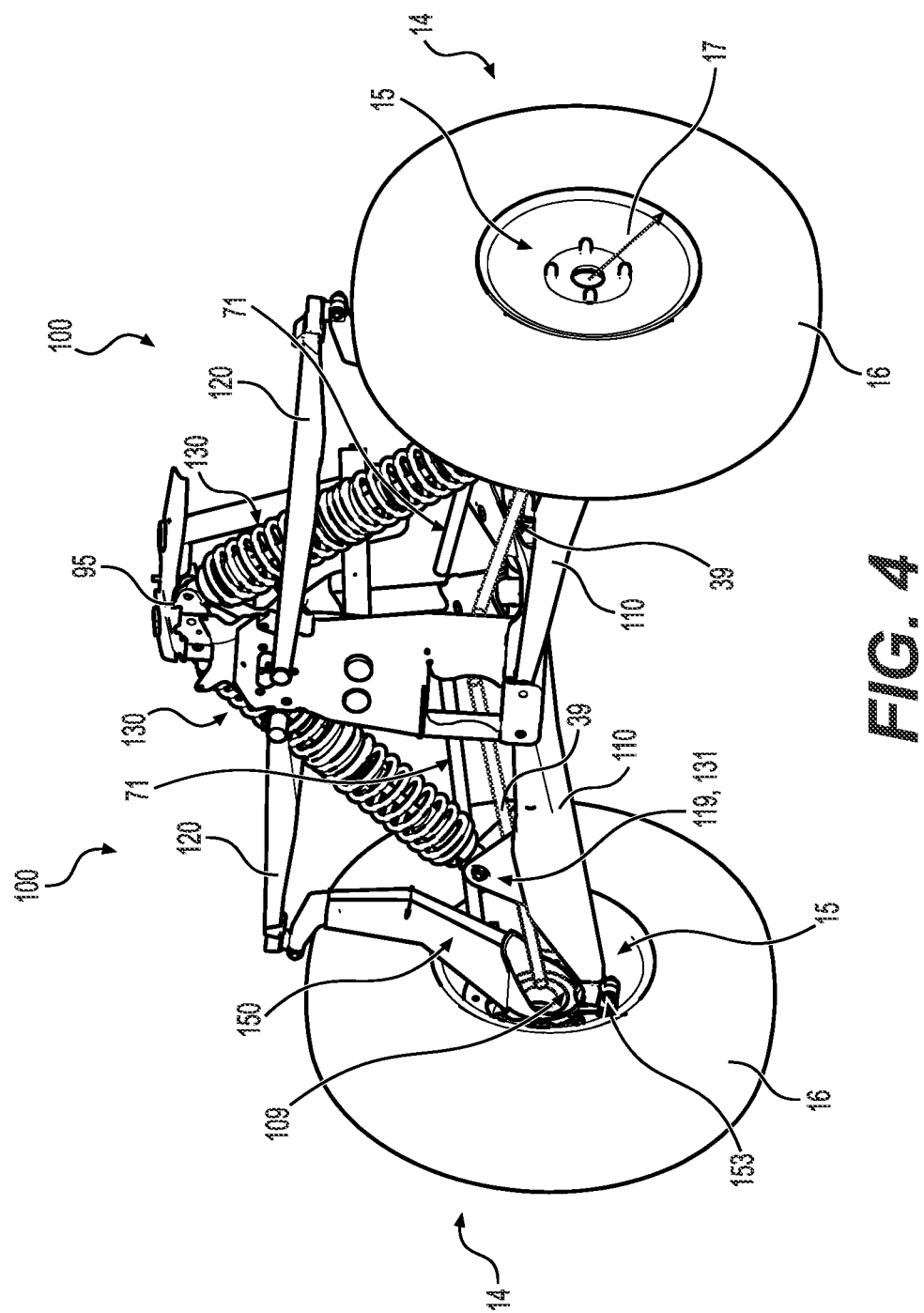
FIG. 4 is a front, left side perspective view of some vehicle components of the vehicle of FIG. 1, including front suspension assemblies and wheels.
Figure 5:
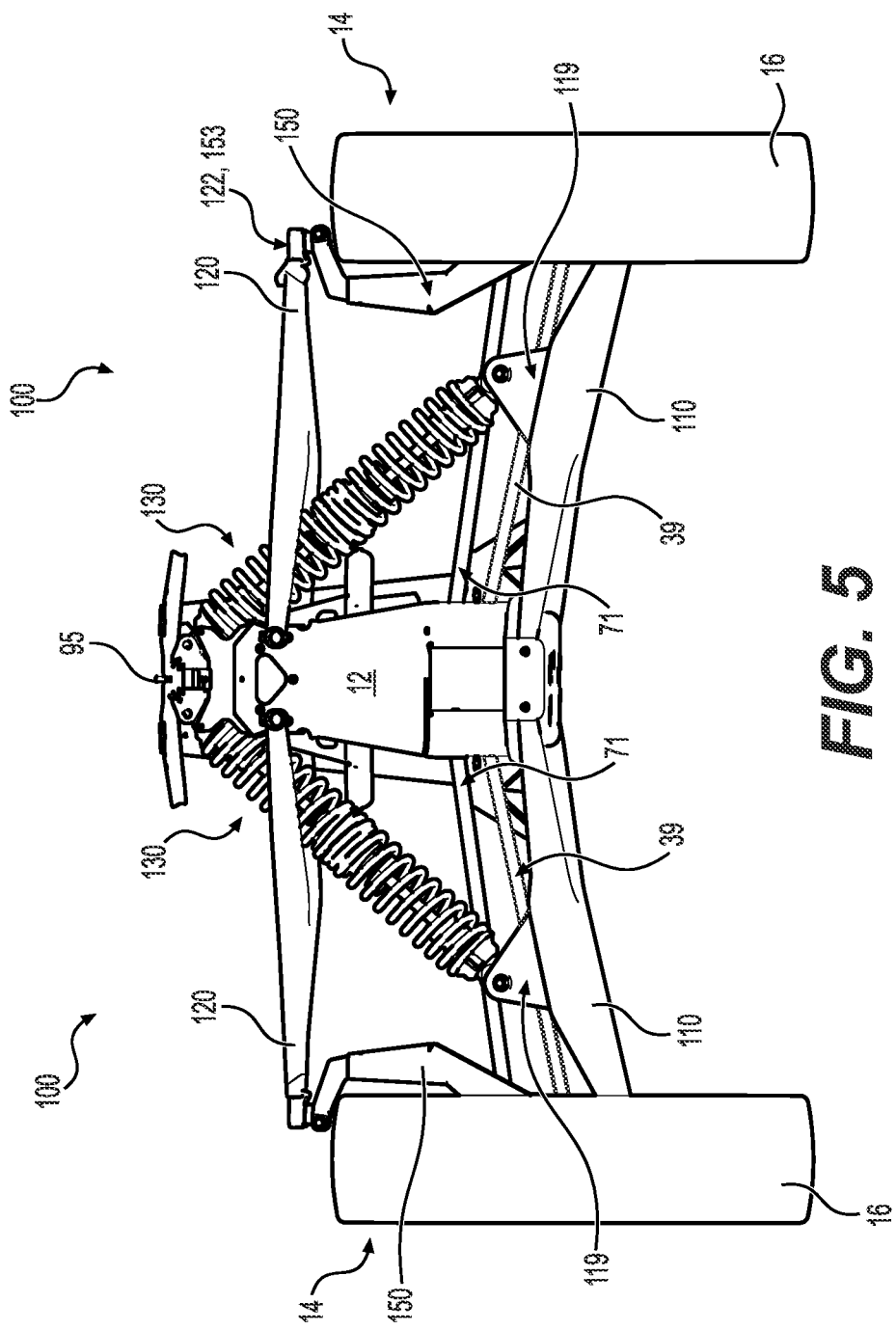
FIG. 5 is a front elevation view of the vehicle components of FIG. 4.
Figure 6:
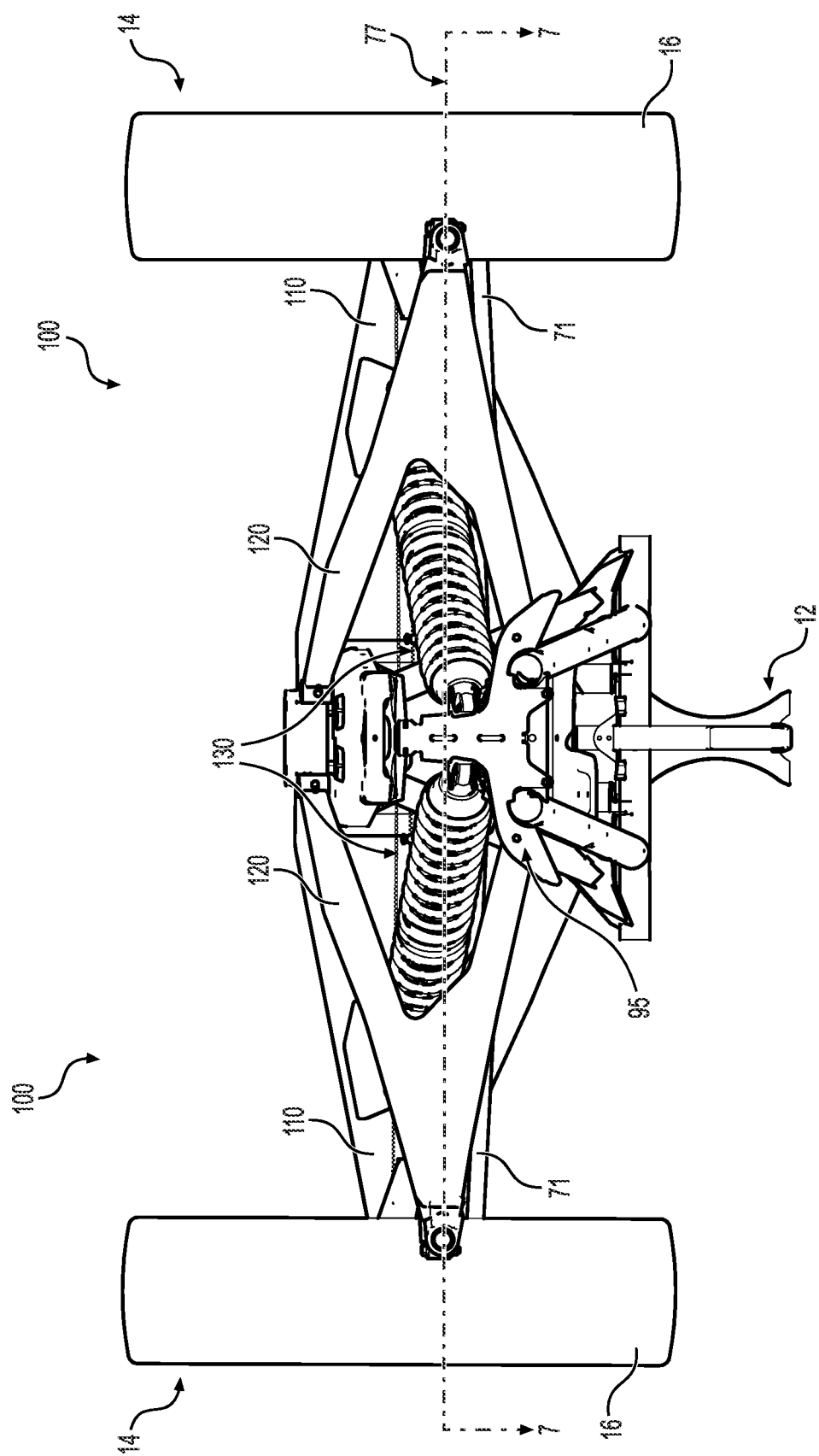
FIG. 6 is a top plan view of the vehicle components of FIG. 4.

As best seen in FIG. 3, the rear fenders 50 define a cargo space 56 therebetween behind the seats 24, 26. The cargo space 56 has a floor 58 extending horizontally between the rear fenders 50. The floor 58 has a plurality of apertures such that the floor 58 can act as an attachments base to receive anchors such as those described in U.S. Pat. No. 8,875,830, issued Nov. 4, 2014, the entirety of which is incorporated herein by reference, in order to secure various items in the cargo space 56. It is contemplated that hooks or loops could be provided instead of or in addition to the apertures in the floor 58. It is also contemplated that the floor 58 could not be provided with any attachment features. It is contemplated that the floor 58 could be replaced by a cargo box that can be tilted in order to dump its content.

Turning now to FIGS. 4 to 10, the front suspension assemblies 100 will be described in more detail. As the left and right front suspension assemblies 100 are mirror images of each other, only the right front suspension assembly 100 will described in detail. Components of the left front suspension assembly 100 that correspond to those of the right front suspension assembly 100 have been labeled with the same reference numerals in the figures.

The front suspension assembly 100 is a double A-arm suspension assembly. As such, the front suspension assembly 100 has a lower A-arm 110, an upper A-arm 120 and a shock absorber assembly 130. In the illustrated embodiment, each of the lower A-arm 110 and the upper A-arm 120 is approximately 850 mm (33.5 in) long, although the exact length could vary for different embodiments. The shock absorber assembly 130 includes two coil springs disposed around a hydraulic shock, although in some implementations the shock absorber assembly 130 could include one coil spring. Since shock absorber assemblies of this type are well known, the shock absorber assembly 130 will not be described in greater detail.

The lower A-arm 110 has two laterally inward ends 114 (FIG. 9) pivotally connected to the frame 12. Similarly, the upper A-arm has two laterally inward ends 124 (FIG. 9) pivotally connected to the frame 12. Laterally outward ends 112, 122 of the A-arms 110, 120 are connected to the knuckle 150, as will be described in more detail below. As is illustrated in at least FIG. 5, the laterally inward ends 114, 124 of the A-arms 110, 120 are arranged to connect to vertically separated portions of the frame 12. As such, stresses applied to the frame 12 by operation of the front suspension assembly 100 are applied to spaced apart portions of the frame 12.

Figure 9:
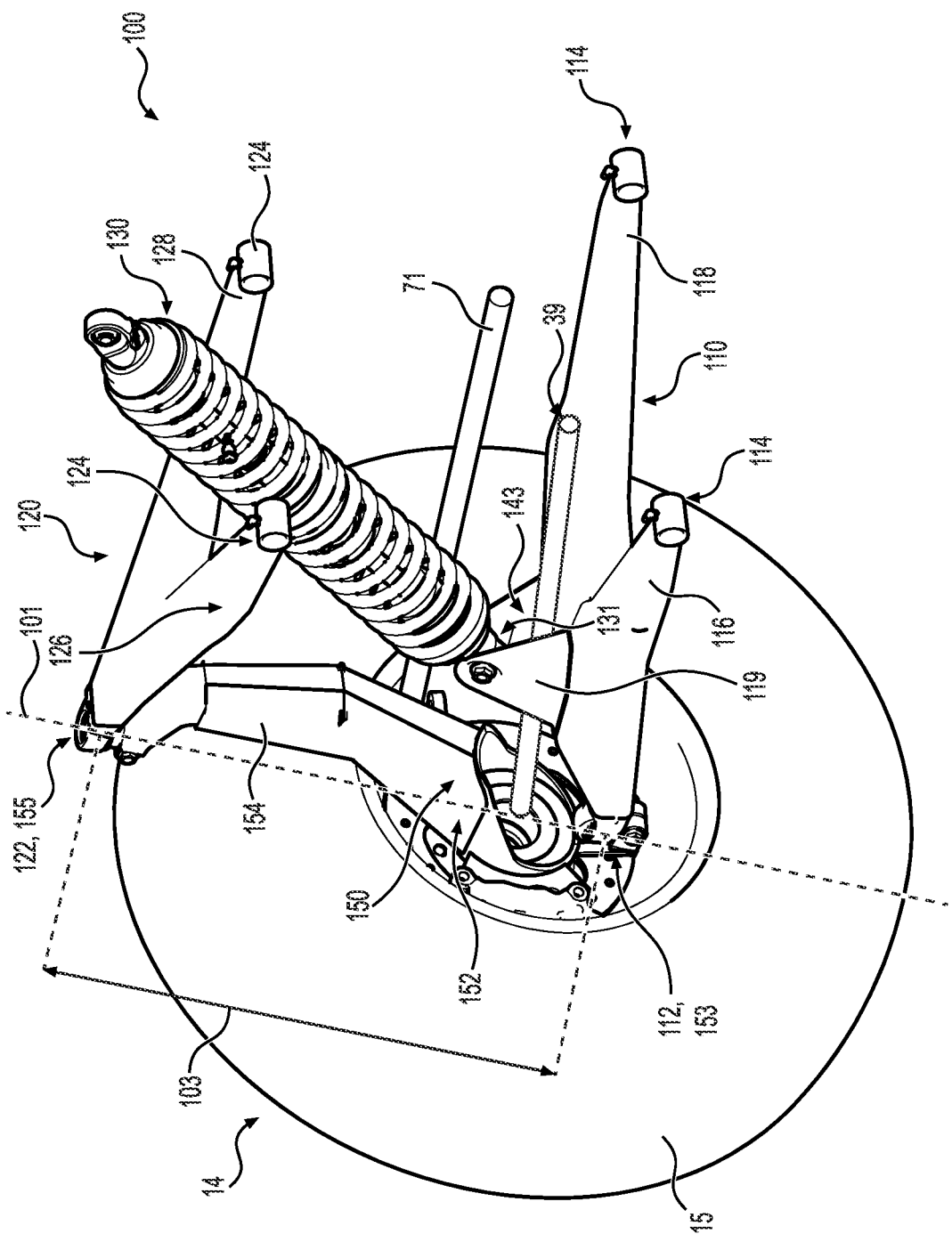
FIG. 9 is a front, left side perspective view of a front right suspension assembly and a front right wheel of the front suspension assemblies and wheels of FIG. 4.

As best seen in FIG. 9, the lower A-arm 110 has a front arm 116 and a rear arm 118. The lower A-arm 110 also includes a bracket 119 connected between the laterally inward and outward ends 112, 114. By the present implementation, the bracket 119 is integrally formed with the lower A-arm 110. In some cases, the bracket 119 could be welded, fastened or otherwise connected to the lower A-arm 110. The bracket 119 connects to a spherical bearing 131 (see FIGS. 9 and 10) of a lower end of the shock absorber assembly 130. The upper end of the shock absorber assembly 130 is connected to a bracket 95 (FIG. 7) by another ball joint 135.

According to the present technology, the shaft 39 for driving the front wheel 14 extends through a space formed between the bracket 119 and the lower A-arm 110. Thus, at least a portion of the shaft 39 is disposed above the lower A-arm 110 and under a portion of the bracket 119. Further, at least a portion of the shaft 39 is disposed above a lower surface of the lower A-arm 110. Similarly stated, the shaft 39 is disposed rearward of a front edge of the lower A-arm 110 and forward of a rear edge of the lower A-arm 100. As can be seen in at least FIGS. 7 and 9, the shaft 39 passes below the bearing 131 connected to the lower A-arm 110, such that the bearing 131 is disposed vertically higher than the shaft 39 along a vertical line 139 transecting the bearing 131 and shaft 39. Otherwise illustrated, the shaft 39 passes through a space 143 (FIG. 9) defined by a cross-sectional plane 141 (FIG. 7) transecting the bracket 119, a front edge of the lower A-arm 110, and a rear edge of the lower A-arm 110.

Similarly, the upper A-arm 120 has a front arm 126 and a rear arm 128. The shock absorber assembly 130 extends upward from the bracket 119 of the lower A-arm 110 and through a space between the front arm 126 and the rear arm 128. The upper end of the shock absorber assembly 130 is connected to the bracket 95 which is connected to the frame 12.

According to the present technology, the front suspension assembly 100 includes the knuckle 150 for connecting laterally outward ends 112, 122 of the A-arms 110, 120 to the wheel hub 19 and the front wheel 14. The knuckle 150 includes a lower portion 152 connected to the wheel hub 19. A ball joint 153 is connected to the lower portion 152 and is disposed below the wheel axis 21. The ball joint 153 connects to the laterally outward end 112 of the lower A-arm 110.

The knuckle 150 further includes an upper portion 154 connected to and extending generally upward from the lower portion 152. Specifically, the upper portion 154 extends upward and inward from the lower portion 152, then upward, and finally slightly outward back toward and over the front wheel 14. In the present implementation, the portions 152, 154 are integrally connected, but it is contemplated that the portions 152, 154 could be separately formed and subsequently welded or fastened together (as one example). When installed on the vehicle 10, the upper portion 154 of the knuckle 150 extends vertically along but spaced from an interior side of the front wheel 14.

An upper ball joint 155 is connected to the upper portion 154 and is disposed on a top portion of the knuckle 150. The laterally outward end 122 of the upper A-arm 120 is pivotally connected to the top of the knuckle 150, specifically to the ball joint 155. As is highlighted by a line 197 illustrated in FIGS. 2 and 14, the upper ball joint 155 is vertically higher than the SIP 97 in at least an at rest position of the suspension assemblies 20, 100 (FIG. 2), also referred to as a stationary or showroom position, and a fully compressed position of the suspension assemblies 20, 100 (FIG. 14), also referred to as a full bump position.

The knuckle 150 pivots relative to the A-arms 110, 120 about a kingpin axis 101 (FIGS. 7 to 9) which is the steering axis of the front wheel 14. Per standard definitions, the kingpin axis 101 of the front suspension assembly 100 is defined by a line 101 extending through the connection points of the A-arms 110, 120 to the knuckle 150, specifically in this case the line 101 extending through the ball joint 153 and the ball joint 155 of the knuckle 150.

Figure 8:
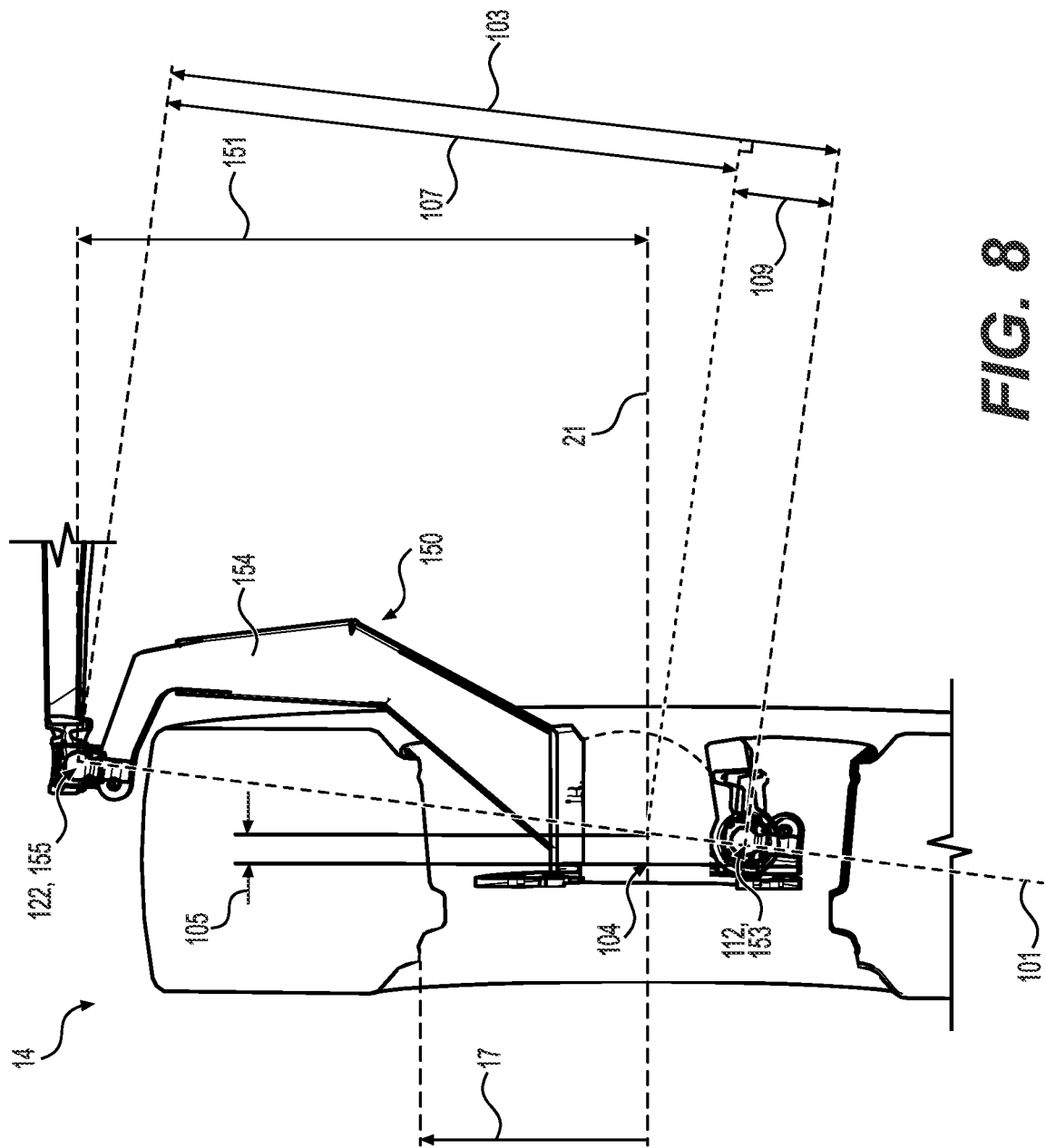
FIG. 8 is a close-up, partial view of the cross-sectional view of FIG. 7.

As can be seen in at least FIG. 8, the ball joint 155 is distanced from the wheel axis 21 by a distance 151 which is greater than the inner rim radius 17. In the present implementation, the ball joint 155 is disposed vertically higher than a top surface of the wheel 14, and the top portion of the knuckle 150 extends over the top surface of the wheel 14. As can be seen in the cross-sectional view of FIG. 7, the kingpin axis 101, the second portion 154 of the knuckle 150, the shock absorber assembly 130, and the shaft 39 extend in a common plane 77. In the present implementation, the plane 77 is arranged vertically and aligned with the line 7-7 of FIG. 6.

A kingpin height 103 of the front suspension assembly 100 is defined by a distance between the ball joint 153 and the ball joint 155, taken along the kingpin axis 101. The kingpin height 103 is equivalently defined as the sum of a distance 109, measured along the kingpin axis 101, from the ball joint 153 to the wheel axis 21 and a distance 107, measured along the kingpin axis 101, from the wheel axis 21 to the ball joint 155. In the illustrated embodiment, the distance 109 is approximately 94 mm (3.7 in) and the distance 107 is approximately 480 mm (18.9 in); the kingpin height 103 as shown is thus approximately 574 mm (22.6 in). Depending on the embodiment, the distance 109 preferably varies between 75 mm (3 in) to 120 mm (4.7 in), although this is not meant to be limiting. Similarly, the distance 107 preferably varies between 203 mm (8 in) to 500 mm (19.7 in) although different lengths are also contemplated. A minimum size of the distance 107 is set by the wheel rim diameter 17, as the ball joint 155 should be disposed above a top edge of the rim 115. Using the size of the wheel 14 in the illustrated embodiment (16-inch rims 15 and 34-inch tires 16), it is noted that the distance 107 from the wheel axis 21 to the ball joint 155 is at least 203 mm (8 in) in order for the ball joint 155 to be above the rim 15. In order for the ball joint 155 to be disposed above and/or over the tire 16, the distance 107 should be at least 432 mm (17 in). Based on the ranges of the lengths 107, 109, the kingpin height 103 thus is preferably between 278 mm (11 in) and 620 mm (24.4 in), although other sizes are possible. According to the present implementation, the distance 107 is greater than two times the distance 109. Projections of the lengths 103, 107, 109 are illustrated in FIG. 8.

Per standard definitions, a spindle length 105 of the front suspension assembly 100 is defined by a horizontal distance 105 between a wheel center 104 of the front wheel 14 and the kingpin axis 101. In the illustrated embodiment, the spindle length 105 is approximately 5 mm (0.2 in). Depending on the embodiment, the spindle length 105 preferably varies between 0 mm (0 in) to 50 mm (2 in), although other sizes are possible. According to the present technology, a ratio of the spindle length 105 to the kingpin length 103 is less than 0.067 (1:15). Depending on the specific implementation, the ratio of the spindle length 105 to the kingpin length 103 could be greater than 0.01 and less than 0.2.

With different arrangements of the suspension 100, different ratios between the different lengths 105, 107, 109 are possible. For instance, a ratio of the distance 107 to the spindle length 105 could be 0 (where the spindle length 105 is 0), 96.1, 9.6, 19.2, 76, 60, or other values. In some embodiments, a ratio of the distance 107 to the distance 109 could be, but is not limited to: 5.1, 4.0, and 3.2. In some embodiments, a ratio of the distance 109 to the spindle length 105 could be, but is not limited to: 0 (where the spindle length 105 is 0), 18.8, 1.9, and 3.8.

As best seen in FIG. 7, the arrangement of the knuckles 150, the lower and upper A-arms 110, 120, and the shock absorber assemblies 130 provide front suspension assemblies 100 that are connected to the frame 12 relatively close to a center of the vehicle 10 in order to provide a relatively large range of motion for the front wheels 14 relative to the vehicle frame 12. For example, the upper ends of the shock absorber assemblies 130 (specifically the ball joints 135) are separated by a distance 180 which is less than a distance 182 separating pivot axes 123 of the laterally inward ends 124 of the upper A-arms 120. The distance 180 between the upper ends of the shock absorber assemblies 130 is also less than a distance 184 separating pivot axes 113 of the laterally inward ends 112 of the lower A-arms 110. The distance 180 separating the upper ends of the shock absorber assemblies 130 is further smaller than a width 186 of the front gear train housing 37. Similarly, the distance 184 separating the laterally inward ends 112 of the lower A-arms 110 and the distance 182 separating the laterally inward ends 122 of the upper A-arms 120 are each smaller than the width 186 of the front gear train housing 37.

Figure 13A:
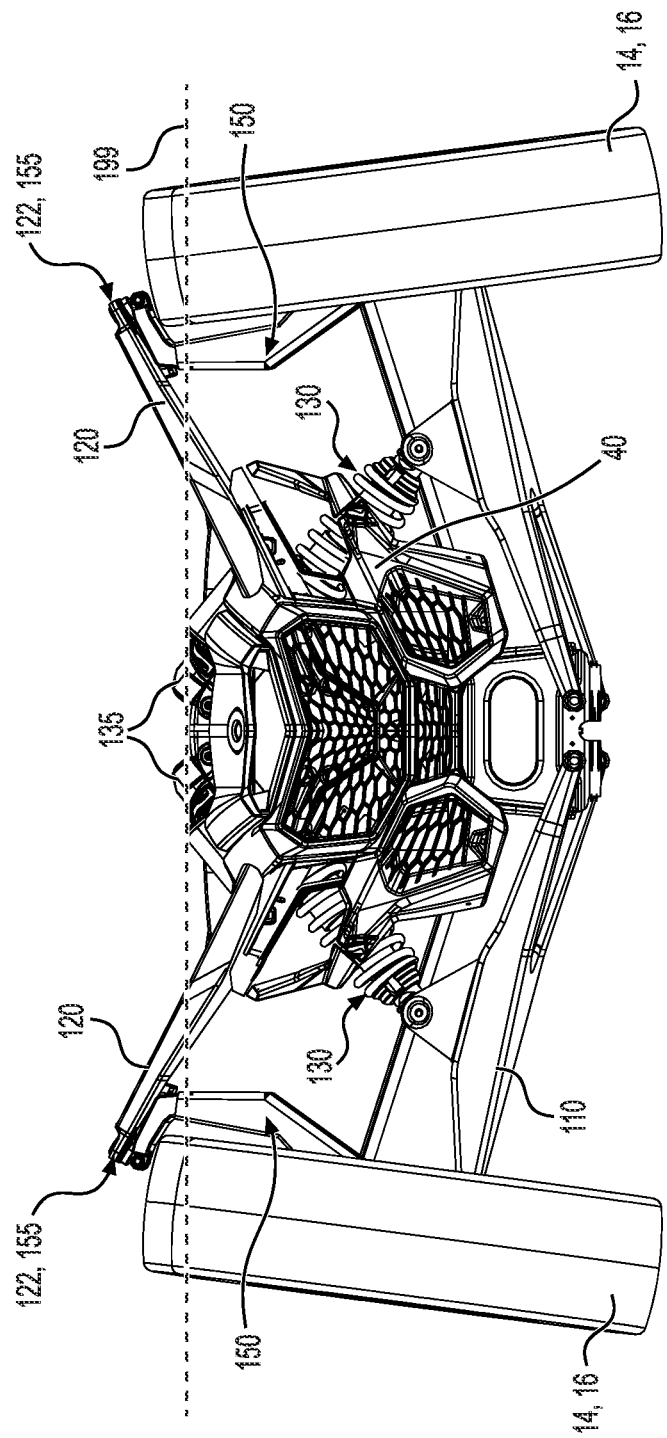
FIGS. 13A and 13B are front elevation and top plan views of some vehicle components of the vehicle of FIG. 1, including the front suspension assemblies, the wheels, and front cowlings, with the suspension assemblies in a full bump position.
Figure 13B:
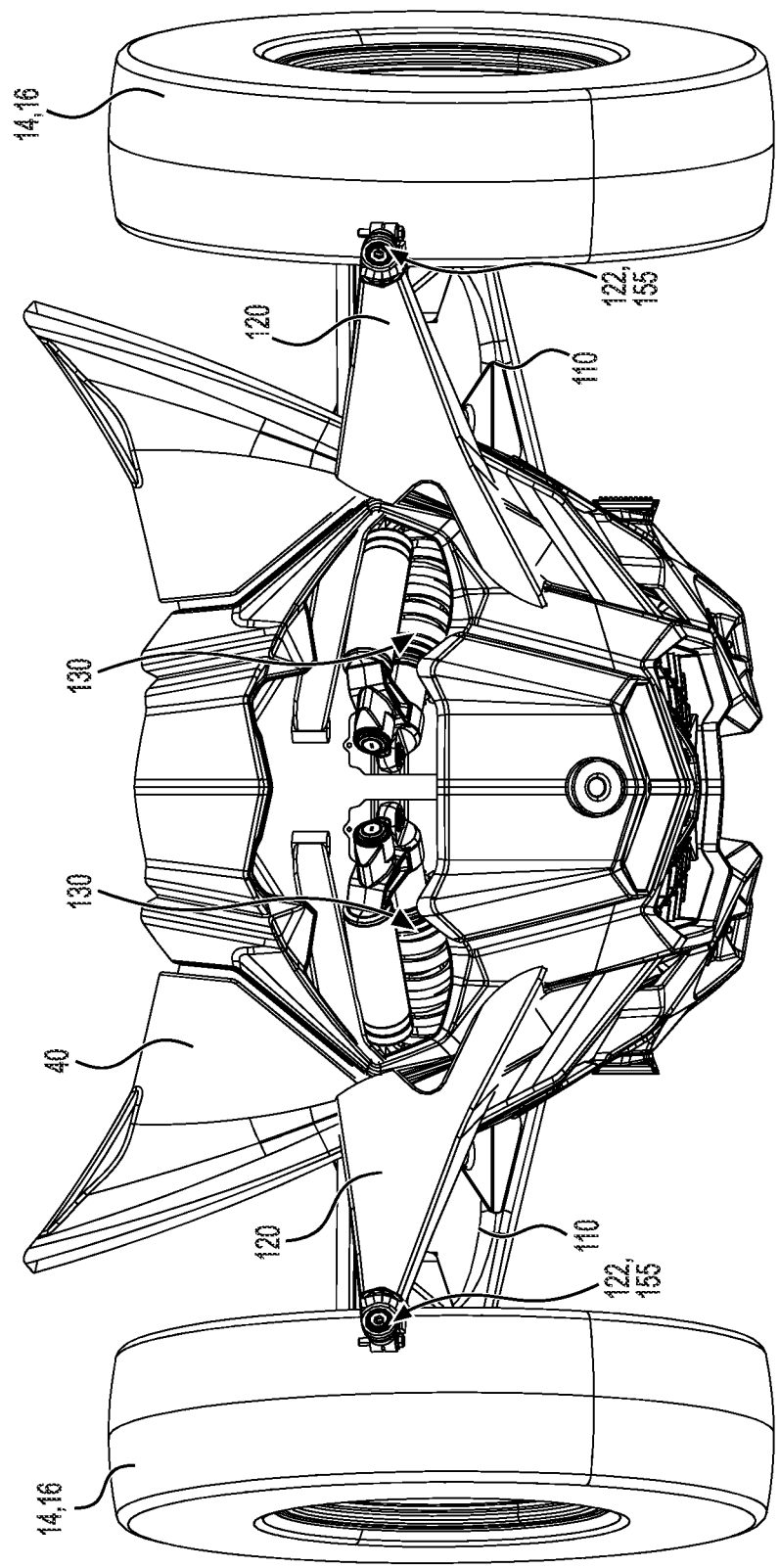

In the illustrated example, with the dimensions set out above, the vehicle 10 has a suspension travel of approximately 22 to 26 inches (558.8 to 660 mm), as defined by a vertical distance of the wheel center 104 relative to the frame 12 between fully extended and fully compressed positions of the front suspension assemblies 100. The front suspension assemblies 100 are illustrated in the fully compressed position, also referred to as a full bump position, in FIGS. 13A and 13B. When in the full compression position, the upper ball joints 155 are vertically higher than the joints 135 connecting the upper ends of the shock absorber assemblies 130, illustrated by line 199 extending through the joints 135. As can be seen from the Figure, the ball joints 155 of the knuckles 150 are also vertically higher than the cowling 40 covering the suspension assemblies 100 when in the full compressed position. As can be seen in FIGS. 1 and 2, the cowling 40 extends over a top, forward portion of the vehicle 10, forward of the cabin area 22. The cowling 40 extends laterally between the two front wheels 14, with cut-outs through which the suspension arms 120 extend (see also FIG. 13B).

Figure 10A:
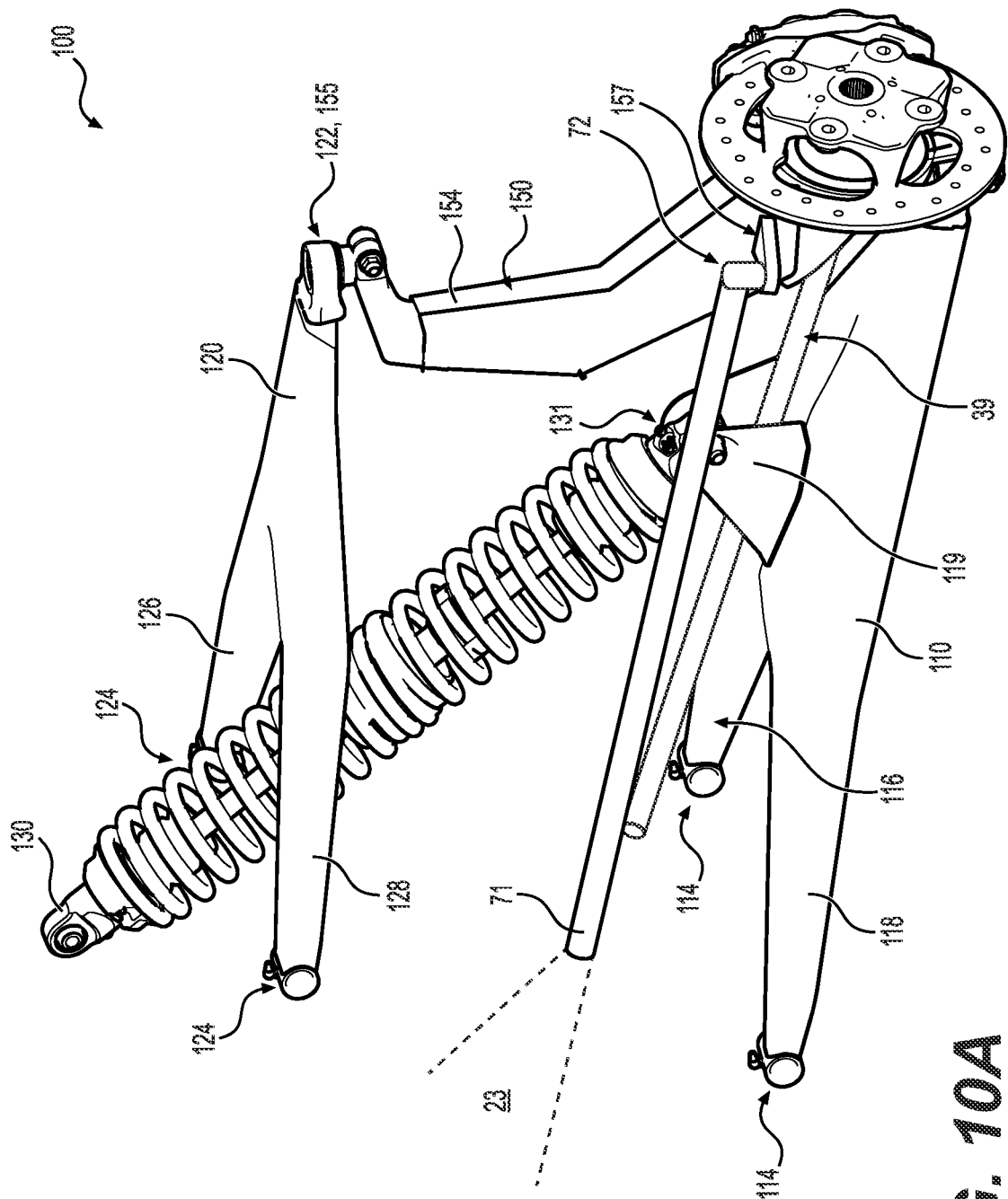
FIG. 10A is a rear, right side perspective view of the front right suspension assembly of FIG. 9, with the front right wheel having been removed.
Figure 10B:
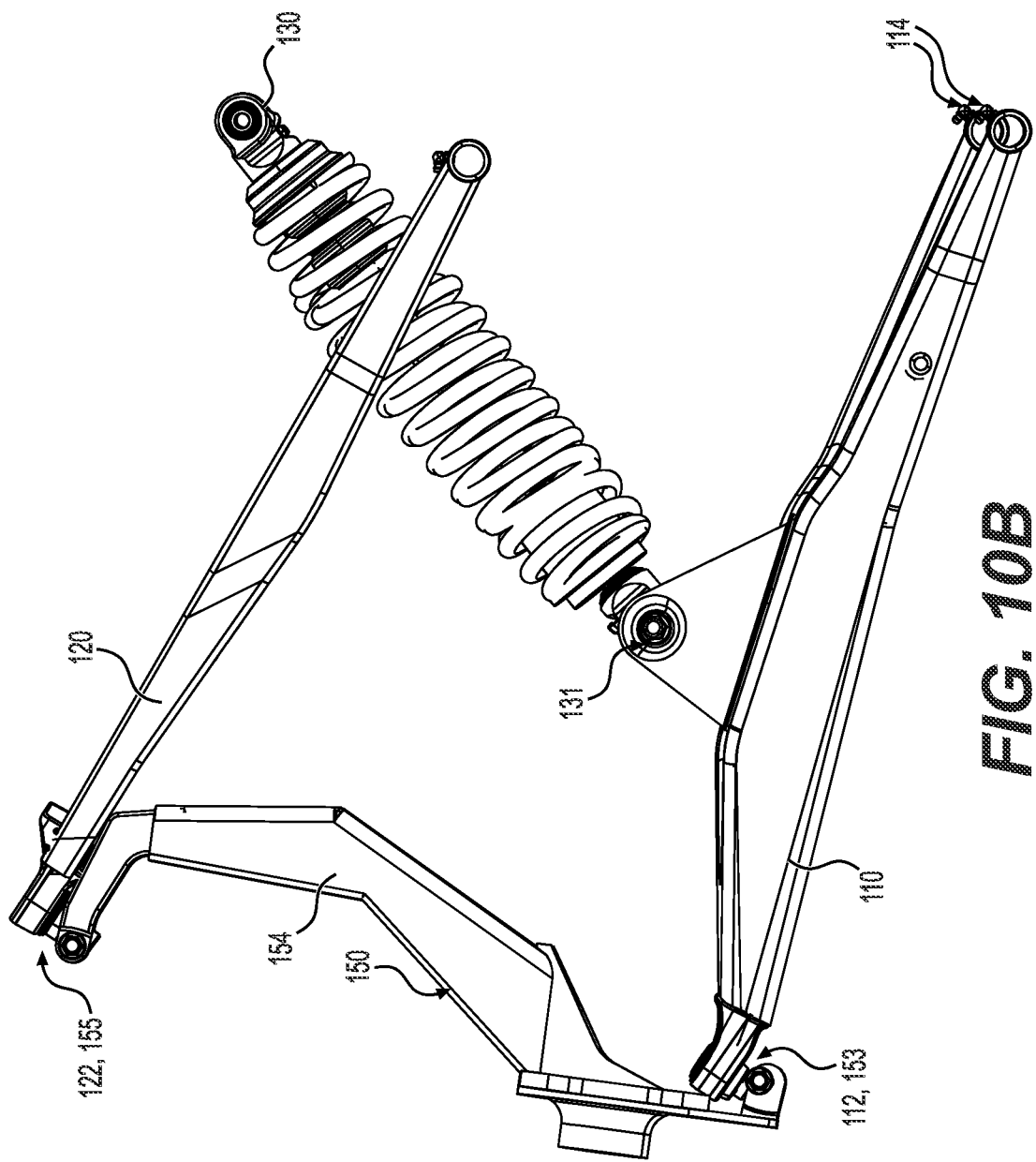
FIG. 10B is a rear elevation view of the front right suspension assembly of FIG. 9, with the front right wheel, a hub, and steering components having been removed.

As is illustrated in at least FIGS. 3 and 10A, steering rods 71 for steering the front wheels of the vehicle 10 are disposed in proximity to the front suspension assemblies 100. The steering wheel 28 is connected to the steering assembly 23 (shown schematically in FIG. 3) which includes a rack and pinion assembly (not shown). Two front steering rods 71 are connected by ball joints (not shown) to the front of the rack and pinion assembly. For each of a left steering rod 71 and a right steering rod 71, a laterally outward end of the steering rod 71 is connected by a ball joint 72 (FIG. 10A) to a tab 157 of the knuckle 150. The tab 157 extends from a rear side of the knuckle 150 and as such the steering rod 71 is disposed rearward of the shock absorber assembly 130. As a result of turning the steering wheel 28, the rack and pinion assembly moves the steering rods 71 left or right, which rotates the knuckle 150, and therefore the front wheels 14, about their kingpin axes 101, thereby steering the vehicle 10 in the direction corresponding to the direction of rotation of the steering wheel 28.

Figure 11:
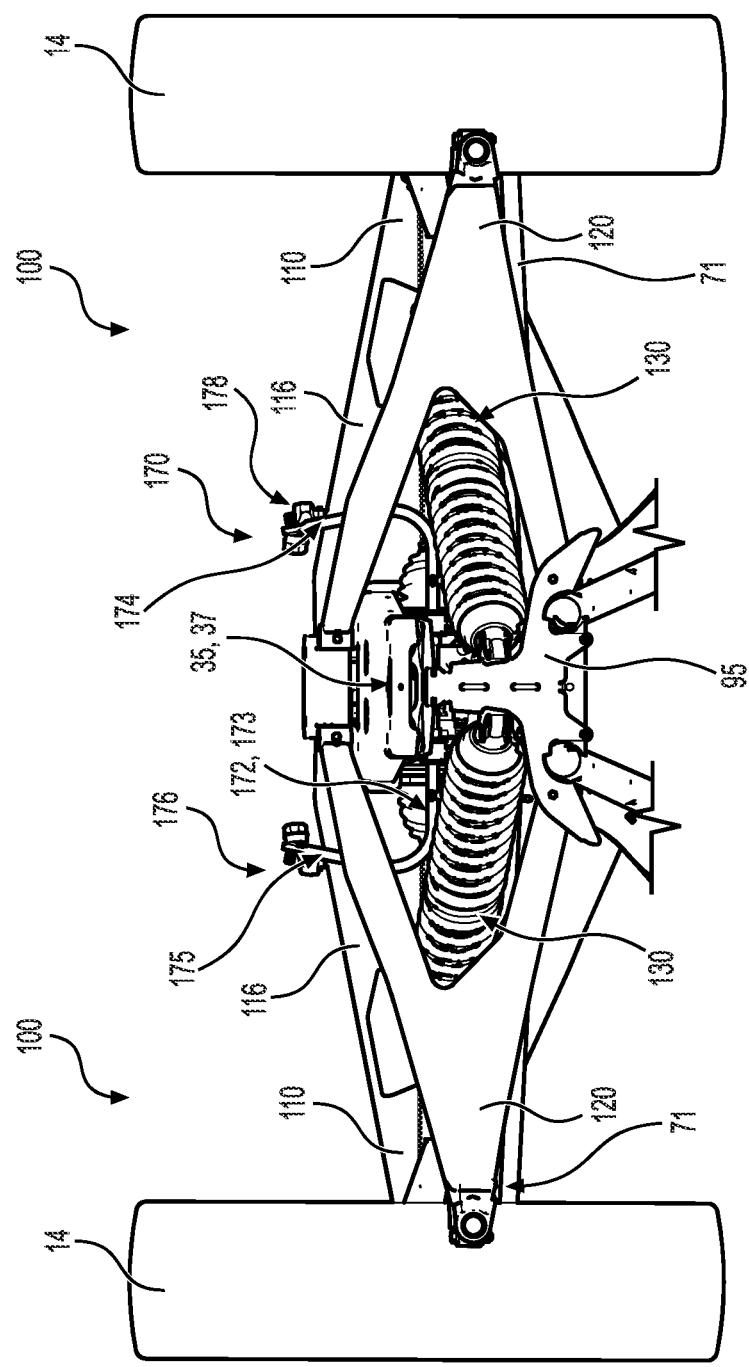
FIG. 11 is the top plan view of the vehicle components of FIG. 6, with a sway bar assembly included.
Figure 12:
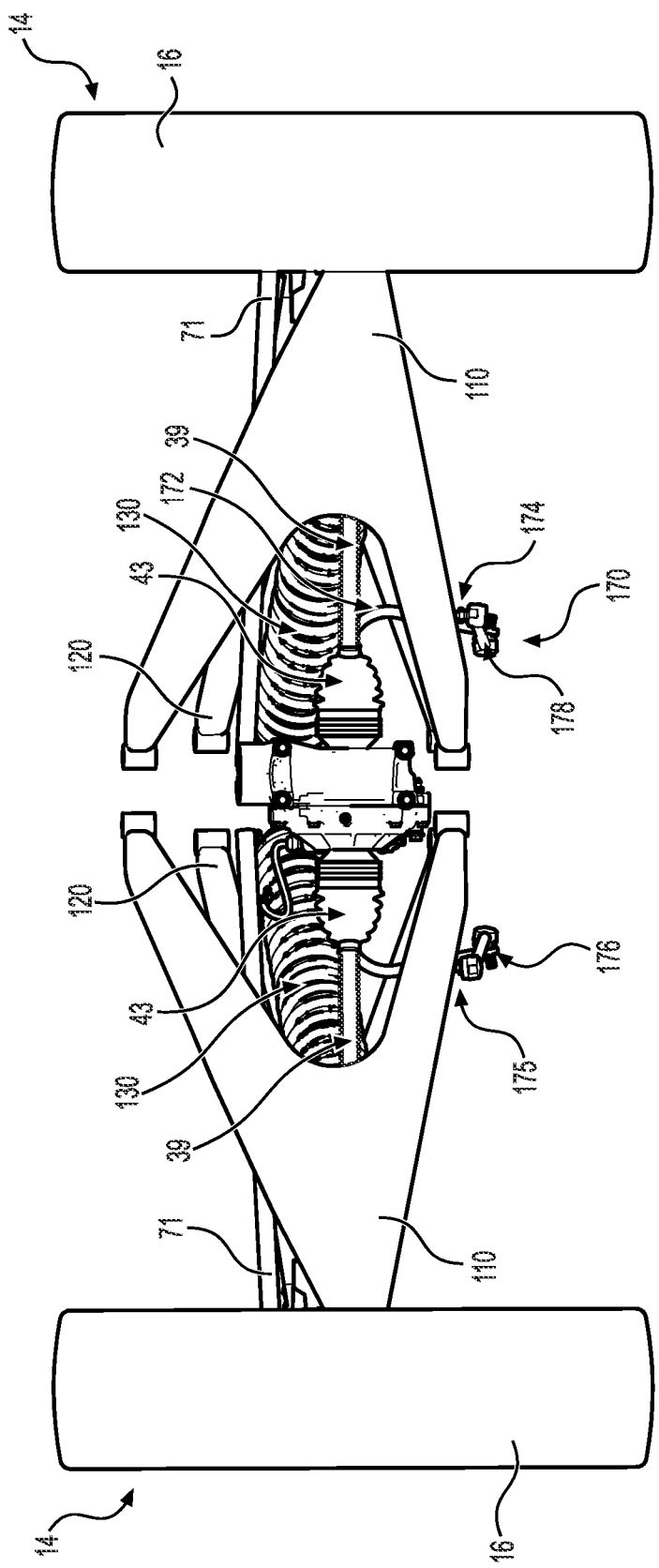
FIG. 12 is a bottom plan view of the vehicle components of FIG. 11.

With reference to FIGS. 11 and 12, the vehicle 10 further includes a sway bar assembly 170 disposed in a front portion of the vehicle 10. The sway bar assembly 170 includes a generally U-shaped sway bar 172. The sway bar 172 includes a central portion 173 arranged generally horizontally left to right, a right portion 174 extending generally forward from a right end of the central portion 173, and a left portion 175 extending generally forward from a left end of the central portion 173. The sway bar assembly 170 further includes left and right links 176, 178. The left link 176 has a bottom end pivotally connected to the front arm 116 of the lower A-arm 110 of the front left suspension assembly 100 and a top end pivotally connected to a left end of the sway bar 172, more specifically to a front end of the left portion 175 of the sway bar 172. The right link 178 has a bottom end pivotally connected to the front arm 116 of the lower A-arm 110 of the front right suspension assembly 100 and a top end pivotally connected to a right end of the sway bar 172, more specifically to a front end of the right portion 174 of the sway bar 172. According to the present implementation, the central portion 173 of the sway bar 172 is disposed forward of the shock absorber assemblies 130. It is contemplated that the sway bar assembly 170 could be differently shaped or arranged, depending on the particular implementation.

Figure 15:
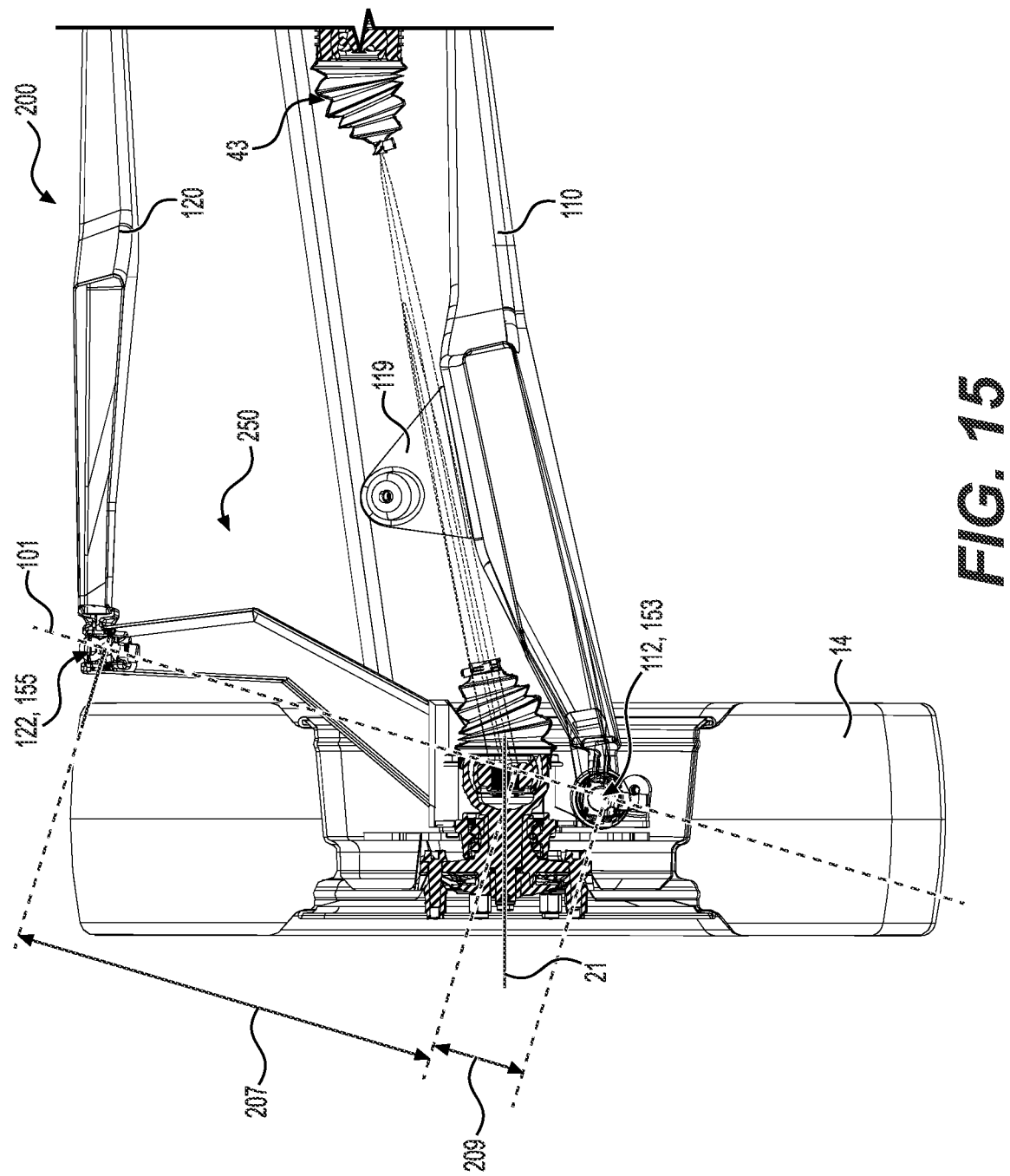
FIG. 15 is a partial, cross-sectional view of a front, right suspension assembly and wheel according to another non-limiting embodiment of the present technology.

With reference to FIG. 15, an additional embodiment of a front suspension assembly 200 including another non-limiting embodiment of a knuckle 250 is illustrated. Elements of the assembly 200 that are similar to those of the assembly 100 retain the same reference numeral and will generally not be described again.

Figure 14:
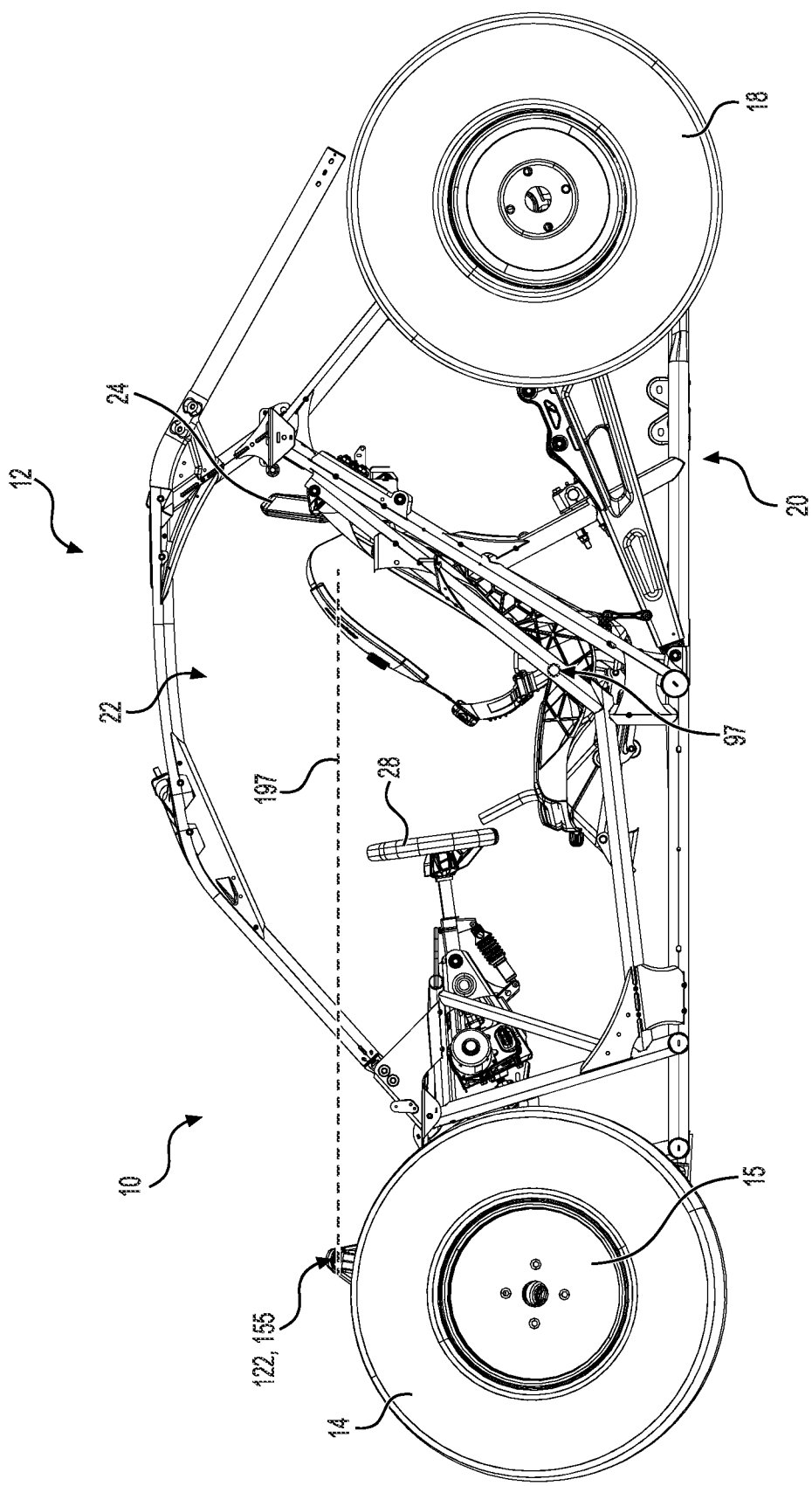
FIG. 14 is left side elevation view of portions of the vehicle of FIG. 1, with body panels removed, with the suspension assemblies in the full bump position.

As is mentioned above, for the ball joint 155 to be disposed above and/or over the 34-inch tire 16 of the illustrated embodiment, the distance from the wheel axis 21 to the ball joint 155 should be at least 432 mm (17 in). In some non-limiting embodiments, it is contemplated that the ball joint 153 could be arranged next to an interior side of the tire 16, as is shown in FIG. 14. For the knuckle 250, a distance 207 from the wheel axis 21 to the ball joint 155 is approximately 415 mm (16.3 in) and a distance 209 from the wheel axis 21 to the ball joint 153 is approximately 94 mm (3.7 in). As is shown, the ball joint 155 extends well above the rim 15 of the wheel 14 but is disposed on the interior side of the wheel 14 rather than over it in the above example embodiment.

The vehicle 10 implemented in accordance with some non-limiting implementations of the present technology can be represented as presented in the following numbered clauses.

CLAUSE 1. A vehicle (10) comprising: a frame (12); a driver seat (24) connected to the frame (12); a front left suspension assembly (100) connected to the frame (12); a front left wheel (14) operatively connected to the front left suspension assembly (100), the front left wheel (14) having a left wheel axis (21), the front left wheel (14) including: a front left rim (15) having an inner rim radius (17), and a front left tire (16) mounted to the front left rim (15); a front right suspension assembly (100) connected to the frame (12); a front right wheel (14) operatively connected to the front right suspension assembly (100), the front right wheel (14) having a right wheel axis (21), the front right wheel (14) including: a front right rim (15) having the inner rim radius (17), and a front right tire (16) mounted to the front right rim (15); a rear left suspension assembly (20) connected to the frame (12); a rear left wheel (18) operatively connected to the rear left suspension assembly (20); a rear right suspension assembly (20) connected to the frame (12); a rear right wheel (18) operatively connected to the rear right suspension assembly (20); a front gear train (35) operatively connected to the front left wheel (14) and the front right wheel (14); a motor (30) operatively connected to the front gear train (35), the motor (30) driving the front right wheel (14) and the front left wheel (14) via the front gear train (35); a right shaft (39) having a laterally outward end connected to the front right wheel (14) and a laterally inward end connected to the front gear train (35); and a left shaft (39) having a laterally outward end connected to the front left wheel (14) and a laterally inward end connected to the front gear train (35), each of the front left suspension assembly (100) and the front right suspension assembly (100) comprising: a knuckle (150) pivotally connected to a corresponding one of the front right wheel (14) and the front left wheel (14), the knuckle (150) including: a first portion (152) connected to a wheel hub (19), the wheel hub (19) being operatively connected to the corresponding one of the front right wheel (14) and the front left wheel (14), the first portion (152) including a first ball joint (153), and a second portion (154) connected to and extending generally upward from the first portion (152), the second portion (154) including a second ball joint (155) disposed at atop portion of the knuckle (150); a lower A-arm (110) having a laterally outward end (112) pivotally connected to the first ball joint (153) of the knuckle (150) and two laterally inward ends (114) pivotally connected to the frame (12); an upper A-arm (120) having a laterally outward end (122) pivotally connected to the second ball joint (155) of the knuckle (150) and two laterally inward ends (124) pivotally connected to the frame (12), the second ball joint (155) being distanced from a corresponding one of the right wheel axis (21) and the left wheel axis (21) by a distance (103) greater than the inner rim radius (17); and a shock absorber assembly (130) having a lower end pivotally connected to the lower A-arm (110) via a bearing (131) of the shock absorber assembly (130) and an upper end pivotally connected to the frame (12), a corresponding one of the left shaft (39) and the right shaft (39) passing below the bearing (131) of the shock absorber assembly (130) connected to the lower A-arm (110), the bearing (131) being disposed vertically higher than the corresponding one of the left shaft (39) and the right shaft (39) along a vertical line transecting the bearing (131) and the corresponding one of the left shaft (39) and the right shaft (39).

CLAUSE 2. The vehicle (10) of clause 1, wherein, for each of the front left suspension assembly (100) and the front right suspension assembly (100), the corresponding one of the left shaft (39) and the right shaft (39) is disposed rearward of a front edge of the lower A-arm (110) and forward of a rear edge of the lower A-arm (110).

CLAUSE 3. The vehicle (10) of clause 1 or 2, wherein each of the front left suspension assembly (100) and the front right suspension assembly (100) further comprises: a bracket (119) connected to the lower A-arm (110), the bracket (119) extending upward from a top surface of the lower A-arm (110), the ball joint (131) of the shock absorber assembly (130) being connected to the bracket (119); and wherein: the lower end of the shock absorber assembly (130) is connected to the bracket (119), the shock absorber assembly (130) being connected to the lower A-arm (110) via the bracket (119).

CLAUSE 4. The vehicle (10) of clause 3, wherein, for each of the front left suspension assembly (100) and the front right suspension assembly (100), the corresponding one of the left shaft (39) and the right shaft (39) passes through a triangular space defined by a cross-sectional plane (77) transecting: the bracket (119), a front edge of the lower A-arm (110), and a rear edge of the lower A-arm (110).

CLAUSE 5. The vehicle (10) of clause 3 or 4, wherein, for each of the front left suspension assembly (100) and the front right suspension assembly (100), the bracket (119) is integrally formed with the lower A-arm (110).

CLAUSE 6. The vehicle (10) of any one of clauses 3 to 5, wherein: for the front left suspension assembly (100), when the vehicle (10) is at rest: the left shaft (39) is disposed above the lower A-arm (110) and under a portion of the bracket (119); and for the front right suspension assembly (100), when the vehicle (10) is at rest: the right shaft (39) is disposed above the lower A-arm (110) and under a portion of the bracket (119).

CLAUSE 7. The vehicle (10) of any one of clauses 1 to 6, wherein: for the front left suspension assembly (100), when the vehicle (10) is at rest: the left shaft (39) is disposed above a lower surface of the lower A-arm (110); and for the front right suspension assembly (100), when the vehicle (10) is at rest: the right shaft (39) is disposed above a lower surface of the lower A-arm (110).

CLAUSE 8. The vehicle (10) of clause 7, wherein: for the front left suspension assembly (100), when the vehicle (10) is at rest: the left shaft (39) is disposed above a top surface of the lower A-arm (110); and for the front right suspension assembly (100), when the vehicle (10) is at rest: the right shaft (39) is disposed above a top surface of the lower A-arm (110).

CLAUSE 9. The vehicle (10) of any one of clauses 1 to 8, further comprising: a steering wheel (28) disposed forward of the driver seat (24); a steering assembly (23) operatively connected to the steering wheel (28); and wherein each of the front left suspension assembly (100) and the front right suspension assembly (100) further comprises: a third ball joint (72) connected to the knuckle (150), a steering rod (71) operatively connected to the steering assembly (23) at a lateral inward end, and a lateral outward end of the steering rod (71) being connected to the third ball joint (73).

CLAUSE 10. The vehicle (10) of clause 9, wherein, for each of the front left suspension assembly (100) and the front right suspension assembly (100), the steering rod (71) is disposed rearward of the shock absorber assembly (130).

CLAUSE 11. The vehicle (10) of any one of clauses 1 to 10, wherein: for each of the front left suspension assembly (100) and the front right suspension assembly (100), the lower A-arm (110) includes a front arm (116) and a rear arm (118); and the vehicle (10) further comprises a sway bar assembly (170) including: a sway bar (172); a left link (176) having a bottom end pivotally connected to the front arm (116) of the lower A-arm (110) of the front left suspension assembly (100) and a top end pivotally connected to a left end of the sway bar (172); and a right link (178) having a bottom end pivotally connected to the front arm (116) of the lower A-arm (110) of the front right suspension assembly (100) and a top end pivotally connected to a right end of the sway bar (172).

CLAUSE 12. The vehicle (10) of clause 11, wherein the sway bar (172) includes: a central portion (173) arranged generally horizontally left to right; a right portion (174) extending generally forward from a right end of the central portion (173); and a left portion (175) extending generally forward from a left end of the central portion (173).

CLAUSE 13. The vehicle (10) of clause 12, wherein the central portion (173) of the sway bar (172) is disposed forward of the shock absorber assembly (130) of the front left suspension assembly (100) and the shock absorber assembly (130) of the front right suspension assembly (100).

CLAUSE 14. The vehicle (10) of any one of clauses 1 to 13, wherein: the upper end of the shock absorber assembly (130) of the front right suspension assembly (100) is at a first distance (180) from the upper end of the shock absorber assembly (130) of the front left suspension assembly (100); the two laterally inward ends (124) of the right upper A-arm (120) are at a second distance (182) from the two laterally inward ends (124) of the left upper A-arm (120); the two laterally inward ends (114) of the right lower A-arm (110) are at a third distance (184) from the two laterally inward ends (114) of the left lower A-arm (110); the first distance (180) is less than the second distance (182); and the first distance (180) is less than the third distance (184).

CLAUSE 15. The vehicle (10) of any one of clauses 1 to 14, wherein, for each of the front left suspension assembly (100) and the front right suspension assembly (100), a kingpin axis (101) is defined by a line (101) extending through the first ball joint (153) and the second ball joint (155).

CLAUSE 16. The vehicle (10) of clause 15, wherein, for each of the front left suspension assembly (100) and the front right suspension assembly (100), the kingpin axis (101), the second portion (154) of the knuckle (150), the shock absorber assembly (130), and a corresponding one of the left shaft (39) and the right shaft (39) extend in a common plane (77).

CLAUSE 17. The vehicle (10) of clause 15, wherein, for each of the front left suspension assembly (100) and the front right suspension assembly (100), a ratio of a spindle length (105) to a kingpin length (103) is less than 1:15.

CLAUSE 18. The vehicle (10) of clause 15, for each of the front left suspension assembly (100) and the front right suspension assembly (100), an upper distance (107) from the wheel axis (21) to the second ball joint (155) is greater than two times a lower distance (109) from the wheel axis (21) to the first ball joint (153), each of the upper distance (107) and the lower distance (109) being measured along the kingpin axis (101).

CLAUSE 19. The vehicle (10) of any one of clauses 1 to 18, wherein, for each of the front left suspension assembly (100) and the front right suspension assembly (100), a top end of the second portion (154) of the knuckle (150) and the laterally outward end (122) of the upper A-arm (120) are disposed vertically higher than a top surface of a corresponding one of the front right wheel (14) and the front left wheel (14).

CLAUSE 20. The vehicle (10) of any one of clauses 1 to 19, wherein, for each of the front left suspension assembly (100) and the front right suspension assembly (100), the second portion (154) of the knuckle (150) extends vertically along an interior side of a corresponding one of the front right wheel (14) and the front left wheel (14).

CLAUSE 21. A vehicle (10) comprising: a frame (12); a driver seat (24) connected to the frame (12); a front left suspension assembly (100) connected to the frame (12); a front left wheel (14) operatively connected to the front left suspension assembly (100), the front left wheel (14) having a left wheel axis (21), the front left wheel (14) including: a front left rim (15) having an inner rim radius (17), and a front left tire mounted to the front left rim (15); a front right suspension assembly (100) connected to the frame (12); a front right wheel (14) operatively connected to the front right suspension assembly (100), the front right wheel (14) having a right wheel axis (21), the front right wheel (14) including: a front right rim (15) having the inner rim radius (17), and a front right tire (16) mounted to the front right rim (15); a rear left suspension assembly (20) connected to the frame (12); a rear left wheel (18) operatively connected to the rear left suspension assembly (20); a rear right suspension assembly (20) connected to the frame (12); a rear right wheel (18) operatively connected to the rear right suspension assembly (20); a front gear train (35) operatively connected to the front left wheel (14) and the front right wheel (14); a housing (37) supported by the frame (12), the front gear train (35) being disposed in the housing (37), the housing (37) having a width (186) defined by a distance (186) between a right side of the housing (37) and a left side of the housing (37); a motor (30) operatively connected to the front gear train (35), the motor (30) driving the front right wheel (14) and the front left wheel (14) via the front gear train (35); a right shaft (39) having a laterally outward end connected to the front right wheel (14) and a laterally inward end connected to the front gear train (35) within the housing (37); and a left shaft (39) having a laterally outward end connected to the front left wheel (14) and a laterally inward end connected to the front gear train (35) within the housing (37), each of the front left suspension assembly (100) and the front right suspension assembly (100) comprising: a knuckle (150) pivotally connected to a corresponding one of the front right wheel (14) and the front left wheel (14), the knuckle (150) including: a first portion (152) connected to a wheel hub (19), the wheel hub (19) being operatively connected to the corresponding one of the front right wheel (14) and the front left wheel (14), the first portion (152) including a first ball joint (153), and a second portion (154) connected to and extending generally upward from the first portion (152), the second portion (154) including a second ball joint (155) disposed at a top portion of the knuckle (150); a lower A-arm (110) having a laterally outward end (112) pivotally connected to the first ball joint (153) of the knuckle (150) and two laterally inward ends (114) pivotally connected to the frame (12); an upper A-arm (120) having a laterally outward end (122) pivotally connected to the second ball joint (155) of the knuckle (150) and two laterally inward ends (124) pivotally connected to the frame (12), the second ball joint (155) being distanced from a corresponding one of the right wheel axis (21) and the left wheel axis (21) by a distance (103) greater than the inner rim radius (17); and a shock absorber assembly (130) having a lower end pivotally connected to the lower A-arm (110) and an upper end pivotally connected to the frame (12), a distance (180) separating the upper end of the shock absorber of the front left suspension assembly (100) and the upper end of the shock absorber of the front right suspension assembly (100) being smaller than the width (186) of the front gear train (35).

CLAUSE 22. The vehicle (10) of clause 21, wherein a distance (184) separating the two laterally inward ends (114) of the lower A-arm (110) of the front left suspension assembly (100) and the two laterally inward ends (114) of the lower A-arm (110) of the front right suspension assembly (100) being smaller than the width (186) of the front gear train (35).

CLAUSE 23. The vehicle (10) of clause 21 or 22, wherein a distance (124) separating the two laterally inward ends of the upper A-arm (120) of the front left suspension assembly (100) and the two laterally inward ends (124) of the upper A-arm (120) of the front right suspension assembly (100) being smaller than the width (186) of the front gear train (35).

CLAUSE 24. The vehicle (10) of any one of clauses 21 to 23, wherein, for each of the front left suspension assembly (100) and the front right suspension assembly (100), the kingpin axis (101), the second portion (154) of the knuckle (150), the shock absorber assembly (130), and a corresponding one of the left shaft (39) and the right shaft (39) extend in a common plane (77).

CLAUSE 25. The vehicle (10) of any one of clauses 21 to 24, wherein, for each of the front left suspension assembly (100) and the front right suspension assembly (100), a ratio of a spindle length (105) to a kingpin length (103) is less than 1:15.

CLAUSE 26. The vehicle (10) of any one of clauses 21 to 25, wherein, for each of the front left suspension assembly (100) and the front right suspension assembly (100), a top end of the second portion (154) of the knuckle (150) and the laterally outward end (122) of the upper A-arm (120) are disposed vertically higher than a top surface of a corresponding one of the front right wheel (14) and the front left wheel (14).

CLAUSE 27. The vehicle (10) of any one of clauses 21 to 26, wherein, for each of the front left suspension assembly (100) and the front right suspension assembly (100), the second portion (154) of the knuckle (150) extends vertically along an interior side of a corresponding one of the front right wheel (14) and the front left wheel (14).

CLAUSE 28. The vehicle (10) of any one of clauses 21 to 27, wherein, each of the front left suspension assembly (100) and the front right suspension assembly (100) further comprises: a bracket (119) connected to the lower A-arm (110), the bracket (119) extending upward from a top surface of the lower A-arm (110); and wherein: the lower end of the shock absorber assembly (130) is connected to the bracket (119), the shock absorber being connected to the lower A-arm (110) via the bracket (119).

CLAUSE 29. The vehicle (10) of clause 28, wherein, for each of the front left suspension assembly (100) and the front right suspension assembly (100), the bracket (119) is integrally formed with the lower A-arm (110).

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:
1. A vehicle comprising:
a frame;

a driver seat connected to the frame;
a front left suspension assembly connected to the frame;
a front left wheel operatively connected to the front left suspension assembly, the front left wheel having a left wheel axis, the front left wheel including:
   a front left rim having an inner rim radius, and
   a front left tire mounted to the front left rim;
a front right suspension assembly connected to the frame;
a front right wheel operatively connected to the front right suspension assembly, the front right wheel having a right wheel axis, the front right wheel including:
   a front right rim having the inner rim radius, and
   a front right tire mounted to the front right rim;
a rear left suspension assembly connected to the frame;
a rear left wheel operatively connected to the rear left suspension assembly;
a rear right suspension assembly connected to the frame;
a rear right wheel operatively connected to the rear right suspension assembly;
a front gear train operatively connected to the front left wheel and the front right wheel;
a motor operatively connected to the front gear train, the motor driving the front right wheel and the front left wheel via the front gear train;
a right shaft having a laterally outward end connected to the front right wheel and a laterally inward end connected to the front gear train; and
a left shaft having a laterally outward end connected to the front left wheel and a laterally inward end connected to the front gear train,
each of the front left suspension assembly and the front right suspension assembly comprising:
   a knuckle pivotally connected to a corresponding one of the front right wheel and the front left wheel, the knuckle including:
      a first portion connected to a wheel hub, the wheel hub being operatively connected to the corresponding one of the front right wheel and the front left wheel, the first portion including a first ball joint, and
      a second portion connected to and extending generally upward from the first portion, the second portion including a second ball joint disposed at a top portion of the knuckle;
   a lower A-arm having a laterally outward end pivotally connected to the first ball joint of the knuckle and two laterally inward ends pivotally connected to the frame, the lower A-arm including a front arm and a rear arm;
   an upper A-arm having a laterally outward end pivotally connected to the second ball joint of the knuckle and two laterally inward ends pivotally connected to the frame,
   the second ball joint being distanced from a corresponding one of the right wheel axis and the left wheel axis by a distance greater than the inner rim radius;
   a shock absorber assembly having a lower end pivotally connected to the lower A-arm via a bearing of the shock absorber assembly and an upper end pivotally connected to the frame; and
   a sway bar assembly including:
      a sway bar including:
         a central portion arranged generally horizontally left to right,
         a right portion extending generally forward from a right end of the central portion, and
         a left portion extending generally forward from a left end of the central portion;
      a left link having a bottom end pivotally connected to the front arm of the lower A-arm of the front left suspension assembly and a top end pivotally connected to a left end of the sway bar; and
      a right link having a bottom end pivotally connected to the front arm of the lower A-arm of the front right suspension assembly and a top end pivotally connected to a right end of the sway bar,
   the central portion of the sway bar is disposed forward of the shock absorber assembly of the front left suspension assembly and the shock absorber assembly of the front right suspension assembly.

2. The vehicle of claim 1, wherein each of the front left suspension assembly and the front right suspension assembly further comprises:
   a bracket connected to the lower A-arm, the bracket extending upward from a top surface of the lower A-arm, the first ball joint being connected to the bracket; and
   wherein:
      the lower end of the shock absorber assembly is connected to the bracket, the shock absorber assembly being connected to the lower A-arm via the bracket.

3. The vehicle of claim 2, wherein, for each of the front left suspension assembly and the front right suspension assembly, the corresponding one of the left shaft and the right shaft passes through a space between:
   the bracket,
   a front edge of the lower A-arm, and
   a rear edge of the lower A-arm.

4. The vehicle of claim 1, wherein:
   for the front left suspension assembly, when the vehicle is at rest:
      the left shaft is disposed above a lower surface of the lower A-arm; and
   for the front right suspension assembly, when the vehicle is at rest:
      the right shaft is disposed above a lower surface of the lower A-arm.

5. The vehicle of claim 1, further comprising:
   a steering wheel disposed forward of the driver seat;
   a steering assembly operatively connected to the steering wheel; and
   wherein each of the front left suspension assembly and the front right suspension assembly further comprises:
      a third ball joint connected to the knuckle,
      a steering rod operatively connected to the steering assembly at a lateral inward end, and
      a lateral outward end of the steering rod being connected to the third ball joint.

6. The vehicle of claim 5, wherein, for each of the front left suspension assembly and the front right suspension assembly, the steering rod is disposed rearward of the shock absorber assembly.

7. The vehicle of claim 1, wherein:
   for each of the front left suspension assembly and the front right suspension assembly, a kingpin axis intersects a line extending through the first ball joint and the second ball joint; and
   for each of the front left suspension assembly and the front right suspension assembly, the kingpin axis, the second portion of the knuckle, the shock absorber assembly, and a corresponding one of the left shaft and the right shaft extend in a common plane.

8. The vehicle of claim 7, for each of the front left suspension assembly and the front right suspension assembly, an upper distance from the wheel axis to the second ball joint is greater than two times a lower distance from the wheel axis to the first ball joint, each of the upper distance and the lower distance being measured along the kingpin axis.

9. The vehicle of claim 1, wherein, for each of the front left suspension assembly and the front right suspension assembly, a top end of the second portion of the knuckle and the laterally outward end of the upper A-arm are disposed vertically higher than a top surface of a corresponding one of the front right wheel and the front left wheel.

10. The vehicle of claim 1, wherein, for each of the front left suspension assembly and the front right suspension assembly, the second portion of the knuckle extends vertically along an interior side of a corresponding one of the front right wheel and the front left wheel.

11. The vehicle of claim 1, wherein the second ball joint of the knuckle of each of the front left suspension assembly and the front right suspension assembly are vertically higher than the upper end of the shock absorber of each of the front left suspension assembly and the front right suspension assembly when the vehicle is in a full bump position.

12. The vehicle of claim 1, wherein a corresponding one of the left shaft and the right shaft passes below the bearing of the shock absorber assembly connected to the lower A-arm, and the bearing is disposed vertically higher than the corresponding one of the left shaft and the right shaft along a vertical line transecting the bearing and the corresponding one of the left shaft and the right shaft.

13. The vehicle of claim 1, wherein the second ball joint being located laterally between an inner and outer surface of the corresponding one of the front left wheel and the front right wheel.

14. A vehicle comprising:
a frame;
a driver seat connected to the frame;
a front left suspension assembly connected to the frame;
a front left wheel operatively connected to the front left suspension assembly, the front left wheel having a left wheel axis, the front left wheel including:
a front left rim having an inner rim radius, and
a front left tire mounted to the front left rim;
a front right suspension assembly connected to the frame;
a front right wheel operatively connected to the front right suspension assembly, the front right wheel having a right wheel axis, the front right wheel including:
a front right rim having the inner rim radius, and
a front right tire mounted to the front right rim;
a rear left suspension assembly connected to the frame;
a rear left wheel operatively connected to the rear left suspension assembly;
a rear right suspension assembly connected to the frame;
a rear right wheel operatively connected to the rear right suspension assembly;
a front gear train operatively connected to the front left wheel and the front right wheel;
a motor operatively connected to the front gear train, the motor driving the front right wheel and the front left wheel via the front gear train;
a right shaft having a laterally outward end connected to the front right wheel and a laterally inward end connected to the front gear train; and
a left shaft having a laterally outward end connected to the front left wheel and a laterally inward end connected to the front gear train,
each of the front left suspension assembly and the front right suspension assembly comprising:
a knuckle pivotally connected to a corresponding one of the front right wheel and the front left wheel, the knuckle including:
a first portion connected to a wheel hub, the wheel hub being operatively connected to the corresponding one of the front right wheel and the front left wheel, the first portion including a first ball joint, and
a second portion connected to and extending generally upward from the first portion, the second portion including a second ball joint disposed at a top portion of the knuckle;
a lower A-arm having a laterally outward end pivotally connected to the first ball joint of the knuckle and two laterally inward ends pivotally connected to the frame;
an upper A-arm having a laterally outward end pivotally connected to the second ball joint of the knuckle and two laterally inward ends pivotally connected to the frame,
the second ball joint being distanced from a corresponding one of the right wheel axis and the left wheel axis by a distance greater than the inner rim radius; and
a shock absorber assembly having a lower end pivotally connected to the lower A-arm via a bearing of the shock absorber assembly and an upper end pivotally connected to the frame,
the upper end of the shock absorber assembly of the front right suspension assembly being at a first distance from the upper end of the shock absorber assembly of the front left suspension assembly,
the two laterally inward ends of the right upper A-arm being at a second distance from the two laterally inward ends of the left upper A-arm,
the two laterally inward ends of the right lower A-arm being at a third distance from the two laterally inward ends of the left lower A-arm,
the first distance being less than the second distance and the first distance being less than the third distance.

15. The vehicle of claim 14, wherein, for each of the front left suspension assembly and the front right suspension assembly, a top end of the second portion of the knuckle and the laterally outward end of the upper A-arm are disposed vertically higher than a top surface of a corresponding one of the front right wheel and the front left wheel.

16. The vehicle of claim 14, wherein, for each of the front left suspension assembly and the front right suspension assembly, the second portion of the knuckle extends vertically along an interior side of a corresponding one of the front right wheel and the front left wheel.

17. The vehicle of claim 14, wherein the second ball joint of the knuckle of each of the front left suspension assembly and the front right suspension assembly are vertically higher than the upper end of the shock absorber of each of the front left suspension assembly and the front right suspension assembly when the vehicle is in a full bump position.

18. The vehicle of claim 14, wherein each of the front left suspension assembly and the front right suspension assembly further comprises:
a bracket connected to the lower A-arm, the bracket extending upward from a top surface of the lower A-arm, the first ball joint being connected to the bracket; and
wherein:

the lower end of the shock absorber assembly is connected to the bracket, the shock absorber assembly being connected to the lower A-arm via the bracket.

\* \* \* \* \*